(12) United States Patent
Levit-Gurevich

(10) Patent No.: US 12,106,112 B2
(45) Date of Patent: Oct. 1, 2024

(54) METHODS AND APPARATUS TO GENERATE GRAPHICS PROCESSING UNIT LONG INSTRUCTION TRACES

(71) Applicant: Intel Corporation, Santa Clara, CA (US)

(72) Inventor: Konstantin Levit-Gurevich, Kiryat Byalik (IL)

(73) Assignee: INTEL CORPORATION, Santa Clara, CA (US)

( * ) Notice: Subject to any disclaimer, the term of this patent is extended or adjusted under 35 U.S.C. 154(b) by 692 days.

(21) Appl. No.: 17/111,136

(22) Filed: Dec. 3, 2020

(65) Prior Publication Data

US 2021/0117202 A1 Apr. 22, 2021

(51) Int. Cl.
  G06F 9/38 (2018.01)
  G06F 9/30 (2018.01)
  G06F 9/54 (2006.01)
  G06T 1/20 (2006.01)

(52) U.S. Cl.
  CPC ........ G06F 9/3836 (2013.01); G06F 9/30098 (2013.01); G06F 9/541 (2013.01); G06T 1/20 (2013.01)

(58) Field of Classification Search
  CPC .............................. G06F 9/3836; G06F 9/541
  See application file for complete search history.

(56) References Cited

U.S. PATENT DOCUMENTS

| | | |
|---|---|---|
| 6,769,054 B1 | 7/2004 | Sahin et al. |
| 10,180,850 B1 | 1/2019 | Kasat et al. |
| 10,867,362 B2 | 12/2020 | Levit-Gurevich et al. |
| 2003/0135609 A1 | 7/2003 | Carlson et al. |
| 2013/0159780 A1 | 6/2013 | Bedwell et al. |
| 2013/0268257 A1* | 10/2013 | Hu ...................... G06F 11/3466 703/22 |
| 2014/0052930 A1 | 2/2014 | Gulati et al. |
| 2016/0344745 A1* | 11/2016 | Johnson .............. H04L 41/0803 |
| 2017/0329618 A1 | 11/2017 | Tsirkin |
| 2018/0046520 A1 | 2/2018 | Baughman |
| 2019/0043158 A1 | 2/2019 | Levit-Gurevich et al. |

(Continued)

OTHER PUBLICATIONS

Lai et al,: "Fast profiling framework and race detection for heterogenous system," Journal of Systems Architecture, vol. 81, pp. 83-91, dated Nov. 1, 2017, 3 pages. (abstract provided).

(Continued)

*Primary Examiner* — Michael J Metzger
(74) *Attorney, Agent, or Firm* — Hanley, Flight & Zimmerman, LLC

(57) ABSTRACT

Methods, apparatus, systems and articles of manufacture are disclosed to generate a graphics processing unit (GPU) long instruction trace (GLIT). An example apparatus includes at least one memory, and at least one processor to execute instructions to at least identify a first routine based on an identifier of a second routine executed by the GPU, the first routine based on an emulation of the second routine, execute the first routine to determine a first value of a GPU state of the GPU, the first routine having (i) a first argument associated with the second routine and (ii) a second argument corresponding to a second value of the GPU state prior to executing the first routine, and control a workload of the GPU based on the first value of the GPU state.

29 Claims, 17 Drawing Sheets

(56) References Cited

U.S. PATENT DOCUMENTS

2019/0102180 A1    4/2019  Hari et al.
2020/0334093 A1*  10/2020  Dubey ................ G06F 11/0778
2021/0183004 A1*   6/2021  Martin ...................... G06T 1/20

OTHER PUBLICATIONS

Huang et al., "Low-overhead and high coverage run-time race detection through selective meta-data management", 2014 IEEE 20th International Symposium on High Performance Computer Architecture (HPCA), IEEE, pp. 96-107, dated Feb. 15, 2014, 12 pages.

International Searching Authority, "International Search Report," in connection with International Application No. PCT/IB2021/000930, issud May 17, 2022, 3 pages.

International Searching Authority, "Written Opinion," in connection with International Application No. PCT/IB2021/000930, issued May 17, 2022, 8 pages.

European Patent Office, "Extended European Search Report," in connection with European Patent Application No. 21196530.6, issued Mar. 16, 2022, 10 pages.

NVIDIA, NVIDIA Nsight Graphics 1.0 User Guide, NVIDIA Developer Zone, Mar. 19, 2018, 201 pages.

NVIDIA, Scrubber, NVIDIA Nsight Graphics 1.0 User Guide, Mar. 19, 2018, 6 pages.

NVIDIA, "Performance Markers," NVIDIA Developer Zone, Mar. 19, 2018, 2 pages.

NVIDIA, "NVIDIA Nsight Graphics 1.1 User Guide," NVIDIA Developer Zone, Apr. 26, 2018, 204 pages.

NVIDIA, "NVIDIA Nsight Graphics 1.2 User Guide," NVIDIA Developer Zone, May 31, 2018, 211 pages.

United States Patent and Trademark Office, "Non-Final Office Action," issued in connection with U.S. Appl. No. 16/129,525, filed Jan. 27, 2020, 15 pages.

United States Patent and Trademark Office, "Notice of Allowance," issued in connection with U.S. Appl. No. 16/129,525, filed May 15, 2020, 12 pages.

United States Patent and Trademark Office, "Notice of Allowance," issued in connection with U.S. Appl. No. 16/129,525, filed Aug. 12, 2020, 12 pages.

United States Patent and Trademark Office, "Non-Final Office Action," issued in connection with U.S. Appl. No. 17/096,590, dated Dec. 10, 2021, 13 pages.

* cited by examiner

GRAPHICS PROCESSING UNIT LONG INSTRUCTION TRACE (GLIT) BINARY FORMAT

| VERSION | GEN MODEL ID | NUMBER OF INSTRUCTIONS | INST_DECODE_T INST0 | INST_DECODE_T INST1 | INST_DECODE_T INST2 | ... | INST_DECODE_T INSTN |
|---|---|---|---|---|---|---|---|
| NUMBER OF RELEVANT BBLS | | NUM OF SENDS | SEND0 DATA (OFFSET, DST, NUM OF REGS) | SEND1 DATA (OFFSET, DST, NUM OF REGS) | | | SEND1 DATA (OFFSET, DST, NUM OF REGS) |
| BBL13 | BBL0 | NUM OF SENDS | SEND0 DATA (OFFSET, DST, NUM OF REGS) | SEND1 DATA (OFFSET, DST, NUM OF REGS) | SEND3 DATA (OFFSET, DST, NUM OF REGS) | BBL5 | NUM OF SENDS |
| | | HW TID COUNT | MAX NUM OF HW THREADS | TID 0 | | | |
| SEND0 DESTINATION VALUES | SEND1 DESTINATION VALUES | | ... | BBL ID | NUM OF BBL RECORDS | BBL ID | HEADER (CE, DMASK, CR0.0, ...) |
| | | | | | | | SEND0 DESTINATION VALUES |
| | | | | | | TID 256 | HEADER (CE, DMASK, CR0.0, ...) |
| SEND0 DESTINATION VALUES | SEND1 DESTINATION VALUES | | ... | BBL ID | NUM OF BBL RECORDS | BBL ID | HEADER (CE, DMASK, CR0.0, ...) |
| | | | | | | | SEND0 DESTINATION VALUES |

FIG. 3

METHODS AND APPARATUS TO GENERATE GRAPHICS PROCESSING UNIT LONG INSTRUCTION TRACES

FIELD OF THE DISCLOSURE

This disclosure relates generally to computers and, more particularly, to methods and apparatus to generate graphics processing unit long instruction traces.

BACKGROUND

Software developers seek to develop code that may be executed as efficiently as possible. To better understand code execution, profiling is used to measure different code execution statistics such as, for example, execution time, memory consumption, etc. In some examples, profiling is implemented by insertion of profiling instructions into the code. Such profiling instructions can be used to store and analyze information about the code execution.

BRIEF DESCRIPTION OF THE DRAWINGS

FIG. 3 depicts an example format of an example long instruction trace.

DETAILED DESCRIPTION

Figure 1:
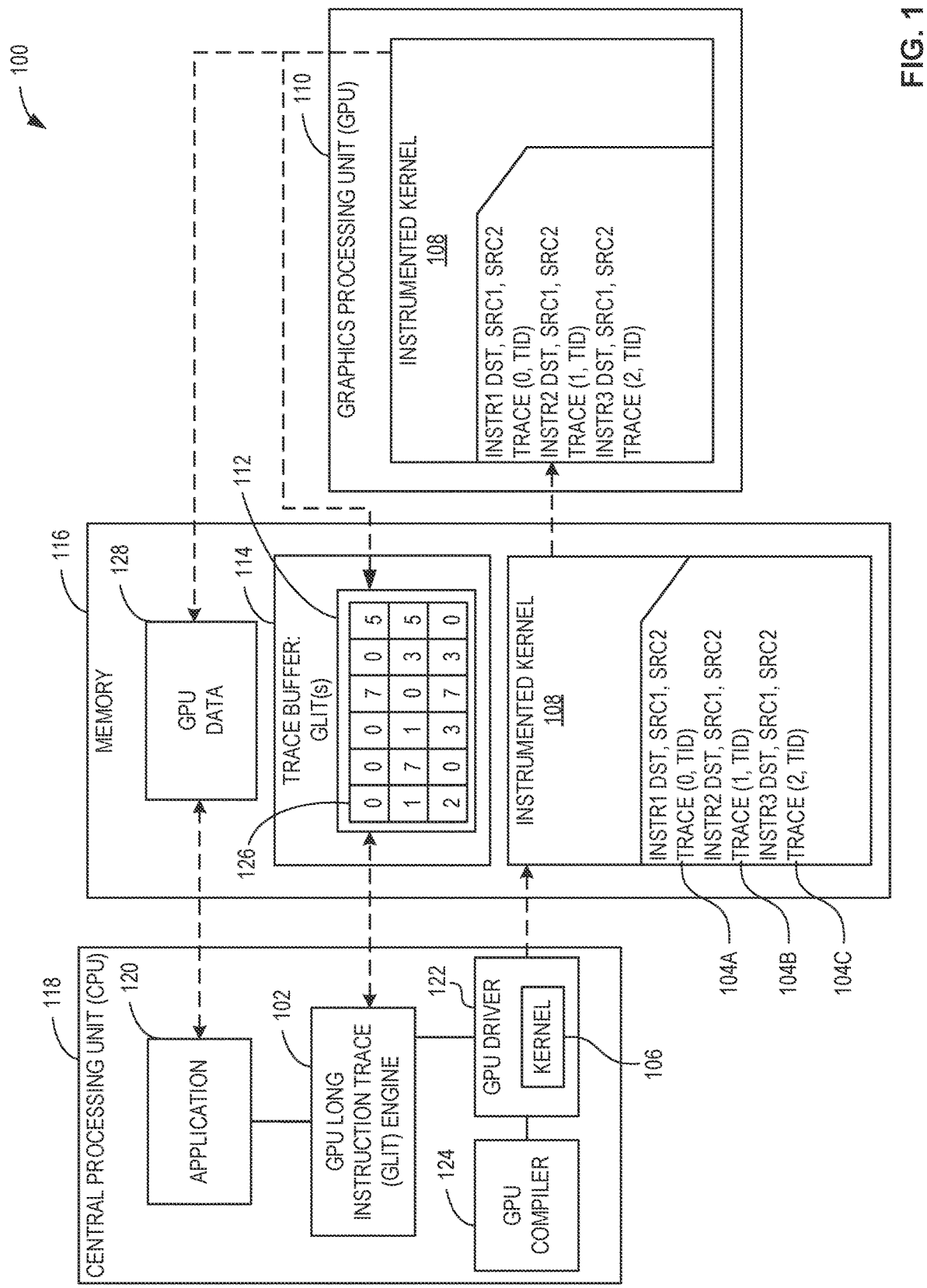
FIG. 1 is a block diagram illustrating an example graphics processing unit long instruction trace (GLIT) engine inserting profiling instructions into an example graphics processing unit (GPU) kernel to be executed by an example GPU.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Developers want to create the most computationally efficient machine readable code to perform their desired task on a processor, such as a central processing unit (CPU). In some instances, developers create machine readable code for a CPU and analyze the efficiency of the machine readable code with a CPU simulator that executes Long Instruction Traces (LITs). A LIT is a snapshot of an architectural state of the CPU. The architectural state may include a state of system memory, which may include values of memory registers that are associated with the CPU. Some such LITs may include a list of system interrupts that are needed to simulate system events such as direct memory access (DMA) traffic. Some such LITs include an entire snapshot of the system memory in response to executing user and/or kernel instructions.

Developers may develop a CPU kernel and use a profiler and/or profiling system to collect operational statistics (e.g., operational parameters, performance statistics, etc.) of the CPU kernel to gain a better understanding of the efficiency of the CPU kernel as executed by the CPU. Profilers insert additional instructions into the CPU kernel to collect such operational statistics. Such profilers and/or profiling systems may be used to determine utilization of the CPU. Such profilers and/or profiling systems may determine the utilization of the CPU because an operating system running on the CPU provides visibility of the CPU utilization for each of the cores and threads of the CPU. Developers may not be able to utilize such LIT and/or profiling techniques on alternatives types of processors, such as graphics processing unit (GPU).

A GPU is an electronic circuit that executes instructions to modify contents of a buffer. Typically, the buffer is a frame buffer that is used to output information to a display device (e.g., a monitor, a touchscreen, etc.). Recently, GPUs have been used for tasks that are not necessarily related to generating output images.

GPUs execute instruction packages commonly referred to as kernels, compute kernels, and/or shaders. The term kernel is used for general purpose computational tasks such as, for example, Open Computing Language (OpenCL) tasks, C for Media tasks, etc. Typically, the term shader is used when a kernel is used for graphics-related tasks such as, for example, DirectX, Open Graphics Library (OpenGL) tasks, pixel shader/shading tasks, vertex shader/shading tasks, etc. While example approaches disclosed herein use the term kernel, such approaches are equally well suited to be used on shaders. Such kernels roughly correspond to an inner loop of a program that is iterated multiple times. As used herein, a GPU kernel refers to a kernel in binary format. A GPU programmer develops kernels/shaders in a high-level programming language such as, for example, a High-Level Shader Language (HLSL), OpenCL, etc., and then compiles the code into a binary version of the kernel, which is then executed by a GPU. Example approaches disclosed herein are applied to the binary version of the kernel.

Much like CPU developers, GPU developers also desire to create the most computationally efficient machine readable code to perform their desired task on a GPU. However, profilers and/or profiling systems may not be efficient for GPU developers to analyze their machine readable code. Unlike CPUs, which have an operating system running on them, GPUs do not have an operating system running on them and, therefore, do not have an ability on the GPUs to measure operational statistics, such as busy and idle time intervals, values of registers in response to an execution of the kernel, etc., at the granularity of the execution units and hardware threads of the GPUs. Some GPU device vendors provide GPU profiling tools, but such tools are limited and are not efficient in dynamically applying intricate analysis of a GPU workload at the level of each specific GPU instruction without compromising the performance of GPU execution.

Examples disclosed herein improve GPU profiling, which may be used to identify improvements in GPU operation, by generating and analyzing GPU long instruction traces (GLITs). In some disclosed examples, the GLITs capture states of a GPU (e.g., GPU states) in response to the GPU executing an instrumented kernel (e.g., an instrumented GPU kernel). Some examples disclosed herein improve operation of the GPU by measuring operating parameters of the GPU based on an analysis of the GLITs and determining whether to adjust operation of the GPU based on the measured operating parameters. In some disclosed examples, a processor, such as a CPU, can determine one or more operating parameters (e.g., operational statistics, performance statistics, etc.) associated with the GPU including at least one of a GPU state, an execution time parameter, a busy time parameter, an idle time parameter, an occupancy time parameter, or a utilization parameter based on the GLITs.

As used herein, an instrumented kernel refers to a kernel that includes profiling and/or tracing instructions to be executed by hardware, that, when executed, measures statistics and/or monitors execution(s) of the kernel. As used herein, a GPU state refers to one or more first values stored in a general-purpose register file (GRF) and/or one or more second values stored in an architecture register file (ARF) associated with a hardware thread of the GPU. For example, a GPU can have a hardware thread that has a GRF including a plurality of first registers and an ARF that includes a plurality of second registers. In such examples, a first value of a first one of the GRF registers may be a first GPU state, a first value of a first one of the ARF registers may be a second GPU state, etc.

As used herein, an execution time of the GPU refers to a time interval, a time duration, etc., in which a hardware thread of the GPU, and/or, more generally, the GPU, uses to execute a kernel (e.g., an instrumented kernel). As used herein, a busy time of the GPU refers to a time interval, a time duration, etc., when a hardware thread of the GPU is busy executing a computational task. As used herein, an idle time of the GPU refers to a time interval, a time duration, etc., when a hardware thread of the GPU is not executing a computational task. As used herein, an occupancy of the GPU refers to a set of busy and/or idle time intervals associated with an execution unit and/or hardware thread of the GPU during execution of one or more computational tasks. As used herein, utilization of the GPU refers to a ratio of the busy time and a total time associated with the execution of the one or more computational tasks.

In some disclosed examples, the CPU inserts additional instructions into kernels to collect information corresponding to the one or more operating parameters associated with execution(s) of the kernels. Additional instructions may include profiling instructions to instruct the GPU to generate a GLIT, which may include, record, and/or otherwise store a hardware thread identifier (TID), a GPU state of a hardware thread, an opcode to identify a GPU instruction, a type of GPU instruction (e.g., a "read SEND" or End-of-Thread (EOT) instruction), timestamps associated with a start and/or end time of an execution of the kernel, etc., and/or a combination thereof. For example, when the GPU executes a kernel that includes the additional instructions, the GPU can store (i) a first value of a GRF register prior to executing the kernel, (ii) a second value of the GRF register after executing the kernel in a GLIT, and/or (iii) a hardware thread identifier corresponding to a hardware thread that executed the kernel. The GPU can store the GLIT in a trace buffer in memory.

In some disclosed examples, the CPU can obtain the GLIT from the trace buffer and replay the GLIT for GPU analysis. For example, the CPU can emulate execution of the kernel based on the first value and/or the second value of the GRF register. In some examples, the CPU can register callback routines (e.g., register with a software application, an operating system (OS), etc., and/or a combination thereof) to provide output data from the emulated execution of the kernel to a GPU profiling tool to determine one or more operating parameters associated with the GPU. Advantageously, the GPU profiling tool may be utilized to determine an efficiency of the kernel as executed by the GPU. For example, the GPU profiling tool can determine that the GPU can execute additional computational tasks, fewer additional computational tasks, etc., based on the one or more operating parameters and, thus, may identify improvements to the kernel, and/or, more generally, to operation of the GPU, scheduling operations of the CPU, etc.

FIG. 1 is a block diagram illustrating an example system 100 including an example GPU long instruction trace (GLIT) engine 102 inserting example profiling instructions 104A-104C into a first example kernel 106 to generate a second example kernel 108. In this example, the first kernel 106 is a GPU kernel to be executed by an example GPU 110. In this example, the second kernel 108 is an instrumented kernel (e.g., an instrumented GPU kernel). Alternatively, the first kernel 106 may be any other type of kernel, such as a kernel to be executed by a neural network processor, a vision processing unit (VPU), etc.

Figure 2:
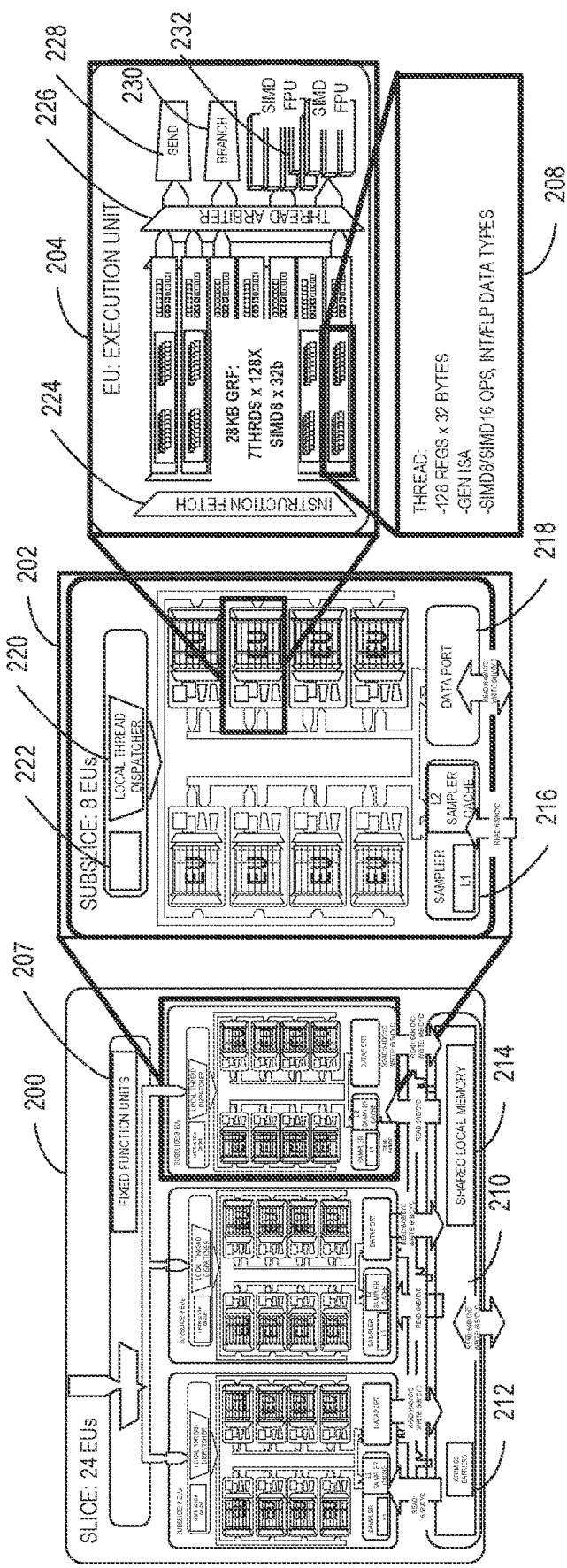
FIG. 2 is an illustration of an example implementation of an example portion of the GPU of FIG. 1.

The GPU 110 may be implemented by a plurality of execution units arranged in slices (e.g., GPU slices). For example, the GPU 110 may be implemented by a plurality of slices (e.g., 3 slices, 6 slices, 12 slices, etc.). An example implementation of a GPU slice 200 is depicted in the illustrated example of FIG. 2. Turning to FIG. 2, the GPU slice 200 includes three example subslices 202 and twenty-four example execution units 204. In this example, each of the sub slices 202 includes eight of the execution units 204. The execution units 204 are independent computational units used for execution of three-dimensional (3-D) shaders, media, and general processing graphics processing unit (GPGPU) kernels. For example, the execution units 204 may be implemented with multi-threaded hardware that is capable of executing multi-issue single instruction, multiple data (SIMD) operations. In this example, each of the execution units 204 may be implemented with seven example threads (e.g., hardware threads, GPU threads, etc.) 206.

In the illustrated example of FIG. 2, the GPU slice 200 includes example fixed function units 207 that are in communication with one(s) of the subslices 202. The fixed function units 207 may be implemented by hardware that is partially and/or otherwise not fully programmable (e.g., by a user, an application, etc.). Alternatively, the GPU slice 200 may not include the fixed function units 207. For example, the fixed function units 207 may be emulated by and/or otherwise implemented by programmable shaders.

In the illustrated example of FIG. 2, the GPU slice 200 includes example cache memory 210. In this example, the cache memory 210 is implemented by level three (L3) data cache that includes example atomic barriers 212 and example shared local memory 214. Alternatively, the cache memory 210 may be implemented with any other type of memory, data storage, etc.

In the illustration example of FIG. 2, one(s) of the subslices 202 are in communication with the cache memory 210 via at least one of an example sampler (e.g., a texture sampler) 216 or an example data port 218. In some examples, the sampler 216 may be implemented as self-contained functional block (e.g., hardware, firmware, and/or software block) within the Graphics Core. In some examples, the sampler 216 may receive messages from other agents in the Graphics Core, fetch data from external memory sources, which may be referred to as "surfaces," perform operations on the data, and/or return the results in standard formats to the requester (or directly to an intermediate memory buffer (e.g., a Render Target Texture (RTT)) if requested). In some examples, the sampler 216 may return a filtered/blended pixel from a location in a texture map.

In this example, the sampler 216 and/or the data port 218 may read data from the cache memory 210 at a rate of sixty-four bytes per cycle. For example, the sampler 216 can sample GPU states of one(s) of the threads 208 of the execution units 204 by reading values from first register(s) of the corresponding ARF(s) and/or second register(s) of the corresponding GRF(s) implemented by the one(s) of the threads 208. Alternatively, the sampler 216 and/or the data port 218 may read data from the cache memory 210 at any other rate. In this example, the data port 218 may write data to the cache memory 210 at a rate of sixty-four bytes per cycle. Alternatively, the data port 218 may write data to the cache memory 210 at any other rate.

In the illustrated example of FIG. 2, one(s) of the execution units 204 are in communication with an example local thread dispatcher 220. In this example, the local thread dispatcher 220 may be implemented with hardware that obtains instructions, such as the second kernel 108 of FIG. 1, and stores the instructions in an example instruction cache 222. For example, the instruction cache 222 may be implemented with memory (e.g., nonvolatile memory, volatile memory, etc.) that can store instructions.

In this example, the local thread dispatcher 220 can dispatch, distribute, and/or otherwise transmit instructions, such as the second kernel 108, to one(s) of the execution units 204 for execution. For example, the local thread dispatcher 220 can spread instances of the second kernel 108 to available one(s) of the execution units 204 for execution. In some examples, hundreds or even thousands of instances of the second kernel 108 may run and/or otherwise execute in parallel on the available one(s) of the execution units 204, with each one(s) of the execution units 204 processing a subset or portion of data as intended by an application, such as the application 120 of FIG. 1. As used herein, a "job" or a "software thread" may refer to an instance of dispatching the second kernel 108 to one of the threads 208, and/or, more generally, to one of the execution units 204.

In the illustrated example of FIG. 2, one(s) of the execution units 204 receive and/or otherwise obtain instructions (e.g., kernels) to be executed from an example instruction fetch interface 224. For example, one(s) of the execution units 204 may obtain a kernel, such as the second kernel 108 of FIG. 1, to execute from the instruction fetch interface 224. The instruction fetch interface 224 may allocate the kernel to one(s) of the threads 208 of the execution unit 204. In this example, one(s) of the threads 208 may each be implemented with 128 32-byte registers. For example, one(s) of the threads 208 may each have an example general-purpose register file (GRF) and an example architectural register file (ARF). Data read or written by the threads 208 may be stored in the corresponding one of the threads 208 GRF. In this example, a GRF may be implemented with 128 general registers with one(s) of the general registers each storing thirty-two bytes. A data element address within the GRF may be denoted by a register number (e.g., r0 to r127 for a 128 general register GRF) and a subregister number.

In the illustrated example of FIG. 2, an ARF may be implemented with a register file including registers used to implement specific Instruction Set Architecture (ISA) features. For example, instruction pointers and/or condition flags may be implemented with the ARF registers. As used herein, "ISA features" refer to processor aspects visible to programs and programmers (e.g., developers) and independent of a particular implementation, including data types, registers, memory access, addressing modes, exceptions, instruction encodings, and the instruction set itself In some examples, a hardware thread of a GPU, such one(s) of the threads 208, can execute instructions that correspond to the ISA features. In some examples, each instruction may be a vector instruction that can operate in different SIMD modes on different floating-point and integer data types. In some examples, each of the instructions may have a corresponding opcode. For example, a GPU architecture may support a limited number of opcodes (e.g., 60 opcodes, 80 opcodes, 100 opcodes, etc.).

In the illustrated example of FIG. 2, one(s) of the threads 208 may be in communication with an example thread arbiter 226. In this example, the thread arbiter 226 may be implemented with hardware that obtains data output(s) from the threads 208 and determine whether the data output(s) correspond to example SEND instructions 228, branch instructions 230, or example SIMD floating point unit (FPU) instructions 232. In this example, the SEND instructions 228 may be generated by the threads 208 in response to the threads 208 terminating execution of kernels. In this example, the branch instructions 230 may be generated by threads 208 in response to executing kernels including conditional instructions, such as an "if," "do," "while," etc., instruction. In this example, the FPU instructions 232 may be generated by the threads 208 in response to the threads executing floating point calculations.

Turning back to the illustrated example of FIG. 1, the GPU 110 may execute the profiling instructions 104A-104C to generate example GLITs 112. In this example, the GPU 110 stores the GLITs 112 in an example trace buffer 114. In this example, the trace buffer 114 is stored in example memory 116. The GLITs 112 include GLIT data generated and/or otherwise outputted by the GPU 110 in response to executing the profiling instructions 104A-104C included in the second kernel 108, in response to being configured by the GLIT engine 102 to generate the GLIT data, etc. For example, the GLITs 112 may include GLIT data that implements and/or otherwise stores a snapshot of an architectural state of the GPU 110. In some examples, the architectural state of the GPU 110 can include first values stored in a GRF and/or one second values stored in an ARF associated with hardware thread(s), such as the threads 208 of FIG. 2, of the GPU 110. In some examples, the GLITs 112 store data associated with one(s) of the SEND instructions 228, the branch instructions 230, or the SIMD FPU instructions 232 of FIG. 2 and/or corresponding timestamps. The GLIT engine 102 may obtain and analyze the GLITs 112 to better understand the execution of the second kernel 108 by the GPU 110. The GLIT engine 102 may determine to adjust operation of the GPU 110 based on an analysis of the GLITs 112.

In some examples, the profiling instructions 104A-104C are profile routines (e.g., machine readable code, firmware and/or software profile routines, etc.), when executed by the GPU 110, generate, determine, and/or store operational information such as, counters, hardware thread identifiers, register values, timestamps, etc., that can be used to better understand the execution of the second kernel 108. For example, the profiling instructions 104A-104C may profile and/or otherwise characterize an execution of the second kernel 108 by the GPU 110.

In some examples, the profiling instructions 104A-104C are inserted at a first address (e.g., a first position) of a kernel (e.g., the beginning of the first kernel 106) to initialize variables used for profiling. In some examples, the profiling instructions 104A-104C are inserted at locations intermediate the original instructions (e.g., between one(s) of the instructions of the first kernel 106). In some examples, the profiling instructions 104A-104C are inserted at a second address (e.g., a second position) of the kernel (e.g., after the instructions from the first kernel 106) and, when executed, cause the GPU 110 to collect and/or otherwise store the metrics that are accessible by the GLIT engine 102. In some examples, the profiling instructions 104A-104C are inserted at the end of the kernel (e.g., the first kernel 106) to perform cleanup (e.g., freeing memory locations, etc.). However, such profiling instructions 104A-104C may additionally or alternatively be inserted at any location or position and in any order.

In the illustrated example of FIG. 1, an example CPU 118 includes and/or otherwise implements the GLIT engine 102, an example application 120, an example GPU driver 122, and an example GPU compiler 124. The application 120 is a software application that may be used to display an output from the GPU 110 on one or more display devices when the GPU 110 executes graphics-related tasks such as, for example, DirectX tasks, OpenGL tasks, pixel shader/shading tasks, vertex shader/shading tasks, etc. In some examples, the application 120 may be implemented with one or more dynamic link libraries (DLLs). Additionally or alternatively, the application 120 may be used to display and/or otherwise process outputs from the GPU 110 when the GPU 110 executes non-graphics related tasks. Additionally or alternatively, the application 120 may be used by a GPU programmer to facilitate development of kernels/shaders in a high-level programming language such as, for example, HLSL, OpenCL, etc. For example, the application 120 can be a profiling tool, such as a GPU profiling tool, a GPU analysis tool, etc.

In the illustrated example of FIG. 1, the application 120 transmits tasks (e.g., computational tasks, graphics-related tasks, non-graphics related tasks, etc.) to the GPU driver 122. In some examples, the GPU driver 122 receives the tasks and instructs the GPU compiler 124 to compile code associated with the tasks into a binary version (e.g., a binary format corresponding to binary code, binary instructions, machine readable instructions, etc.) to generate the first kernel 106. The GPU compiler 124 transmits the compiled binary version of the first kernel 106 to the GPU driver 122.

In some examples, the GLIT engine 102 configures, programs, and/or otherwise controls the GPU 110 to output data to the trace buffer 114. For example, the GLIT engine 102 may instruct the GPU driver 122 to control the GPU 110 to dump and/or otherwise output GLIT data, such as data and/or information described below in FIG. 3, at specific points of execution of a kernel, such as the first kernel 106 or the second kernel 108. In some examples, the GLIT engine 102 may instruct the GPU driver 122 to cause the GPU 110 to output data associated with an instruction to be executed by the GPU 110 to the trace buffer 114. For example, the GLIT engine 102 may cause the GPU 110 to output data associated with a GPU instruction (e.g., an instruction included in the first kernel 106, the second kernel 108, etc.), a device access instruction (e.g., a memory access instruction, an instruction to be executed by the GPU 110 that causes the GPU 110 to access the sampler 216, the cache memory 210, etc., of FIG. 2, etc.), etc.

In some examples, in response to the GPU 110 executing the GPU instruction (e.g., an addition instruction, a move instruction, etc.) the GPU 110 may output the GPU instruction, a first value of a register prior to executing the GPU instruction, a second value of the register after executing the GPU instruction, etc., to the trace buffer 114. In some examples, in response to the GPU 110 executing the device access instruction to cause the GPU 110 to transmit a register value to the sampler 216, the GPU 110 may output the device access instruction, the register value, etc., to the trace buffer 114. Advantageously, in some such examples, the GLIT engine 102 may control the GPU 110 to output GLIT data to the trace buffer 114 without instrumenting a kernel.

In some examples, the GLIT engine 102 may control the GPU 110 to output GLIT data to the trace buffer 114 via binary instrumentation. For example, the GLIT engine 102 may obtain the first kernel 106 (e.g., in a binary format) from the GPU driver 122. The GLIT engine 102 may instrument the first kernel 106 by inserting additional instructions, such as the profiling instructions 104A-104C, into the first kernel 106. For example, the GLIT engine 102 may modify the first kernel 106 to create an instrumented GPU kernel, such as the second kernel 108. That is, the GLIT engine 102 creates the second kernel 108 without executing any compilation of the first kernel 106. In this manner, already-compiled GPU kernels can be instrumented and/or profiled. The second kernel 108 is passed to the GPU 110 via the memory 116. For example, the GLIT engine 102 can transmit the second kernel 108 to the GPU driver 122, which, in turn, may store the second kernel 108 in the memory 116 for retrieval by the GPU 110.

In some examples, the GPU 110 executes the profiling instructions 104A-104C to generate one or more of the GLITs 112. In this example, the profiling instructions 104A-104C include a first example profiling instruction 104 of "TRACE (0, TID)" inserted at a first position, where the first profiling instruction 104A corresponds to generating a trace (e.g., one of the GLITs 112). For example, the trace may refer to a sequence of data records that are written (e.g., dynamically written) into a memory buffer, such as the trace buffer 114. In some examples, the first trace operation may be implemented with a read operation of a register (e.g., a hardware register) associated with a hardware thread and a store operation of a first value read from the register in a first variable. In such examples, the first trace operation may be implemented by generating a first one of the GLITs 112 to include (i) the first value and/or (ii) a thread identifier (TID) associated with a hardware thread that accessed the register.

In the illustrated example of FIG. 1, the profiling instructions 104A-104C include a second example profiling instruction 104B of "TRACE (1, TID)" inserted at a second position, where the second profiling instruction 104B corresponds to a second trace operation. In some examples, the second trace operation may be implemented with a read operation of the register associated with the hardware thread and a store operation of a second value read from the register in a second variable. For example, the second value may be different from the first value of the first trace operation because the second value may be generated in response to the GPU 110 executing the second kernel 108. In such examples, the second trace operation may be implemented by generating a second one of the GLITs 112 to include (i) the second value and/or (ii) the TID associated with the hardware thread that accessed the register.

In the illustrated example of FIG. 1, the profiling instructions 104A-104C include a third example profiling instruction 104C of "TRACE (2, TID)" inserted at a third position, where the third profiling instruction 104C corresponds to a third trace operation. In some examples, the third trace operation may be implemented with a read operation of the register associated with the hardware thread and a store operation of a third value read from the register in a third variable. For example, the third value may be different from the first value of the first trace operation and/or the second value of the second trace operation because the third value may be generated in response to the GPU 110 executing the second kernel 108. In such examples, the third trace operation may be implemented by generating a third one of the GLITs 112 to include (i) the third value and/or (ii) the TID associated with the hardware thread that accessed the register.

In some examples, in response to executing the profiling instructions 104A-104C, and/or, more generally, the second kernel 108, the GPU 110 stores the GLITs 112 in the trace buffer 114. The trace buffer 114 includes example records (e.g., data records) 126 that may implement the GLITs 112. For example, the records 126 may implement GLIT data from the GPU 110. In some examples, the records 126, and/or, more generally, the GLITs 112, may be encoded in a binary format based on an example GLIT format 300 depicted in the illustrated example of FIG. 3.

Turning to FIG. 3, the GLIT format 300 is depicted in plaintext and may be representative of, and/or otherwise correspond to, an example binary data format that may implement one(s) of the GLITs 112 of FIG. 1. For example, the GLIT format 300 may be used to implement an example binary file (e.g., an encoded binary file) that may be used by the GPU 110 to store the GLIT(s) 112. Alternatively, the GLIT format 300 may be implemented using any other format.

In some examples, the CPU 118 of FIG. 1 may obtain the records 126 from the trace buffer 114. In such examples, the CPU 118 may generate one of the GLIT(s) 112 to include one(s) of the records 126 based on the GLIT format 300. In some examples, the GLIT format 300 may be implemented as a buffer in an encoded binary format that includes a plurality of example records (e.g., data records) 302. For example, the records 302 may implement the records 126 of FIG. 1. In such examples, a first one of the records 302 may correspond to a first one of the records 126 of FIG. 1.

In some examples, the GLIT format 300 may be generated in an atomic manner. For example, the GPU 110 may sequentially generate the GLIT(s) 112 in the GLIT format 300 where a first one of the records 302 is adjacent to a second one of the records 302 and where the first one of the records 302 is generated prior to the second one of the records 302. Alternatively, the GLIT(s) 112 having the GLIT format 300 may be generated in a different manner than atomic, such as with a round-robin technique. The GPU 110 may generate the records 302 from a plurality of hardware threads, such as the threads 208 of FIG. 2.

In the illustrated example of FIG. 3, the GLIT format 300 includes ones of the data records 302 that are administrative in nature, such as a format version (VERSION) of the GLIT format 300, a GEN model identifier (GEN MODEL ID), etc. For example, the GEN MODEL ID may refer to a particular architecture of the GPU 110. In some examples, the CPU 118 may determine a behavior, a specification, etc., of the GPU 110 based on the GEN MODEL ID.

In the illustrated example of FIG. 3, the GLIT format 300 includes decoded information of an instruction of a kernel, such as the second kernel 108 of FIG. 1. For example, INST_DECODE_T INST0 may correspond to a decoded version of a first kernel instruction, such as INSTR1 DST, SRC1, SRC2 of FIG. 1 of the second kernel 108. In some examples, INST_DECODE_T INST1 may correspond to a decoded version of a second kernel instruction, such as INSTR2 DST, SRC1, SRC2 of FIG. 1 of the second kernel 108. In some examples, the decoded kernel instructions may implement decoded GLIT data that may be used by the GLIT engine 102 to emulate and/or otherwise simulate execution of the instructions of the second kernel 108 by the GPU 110.

In the illustrated example of FIG. 3, the GLIT format 300 includes example operating parameters such as a number of instructions (NUMBER OF INSTRUCTIONS) (e.g., a number of the instructions of the second kernel 108), a number of relevant basic blocks (BBLs) (NUMBER OF RELEVANT BBLs), a number of SEND instructions (NUM OF SENDS) (e.g., a number of the SEND instructions 228 of FIG. 2), data associated with each of the SEND instructions (e.g., SEND0 DATA, SEND1 DATA, etc.), a maximum number of hardware threads (MAX NUM OF HW THREADS) (e.g., a maximum number of the threads 208 of FIG. 2), a hardware thread identifier count (HW TID COUNT), etc. For example, a BBL may refer to a contiguous set of instructions having singular entry and exit points. In such examples, a kernel, such as the second kernel 108, may be logically divided into one or more BBLs. Additionally or alternatively, the GLIT 300 may include operating parameters corresponding to a different type of instruction, such as a load instruction. For example, NUM OF SENDS may be replaced with a number of load instructions (NUM OF LOADS), SEND0 DATA may be replaced with LOAD0 DATA, SEND0 DESTINATION VALUES may be replaced with LOAD0 DESTINATION VALUES, etc., and/or a combination thereof.

In some examples, the GLIT format 300 may be implemented to store data associated with a device access instruction, such as a SEND instruction, a READ SEND instruction, etc. For example, the GLIT format 300 may include an offset value (OFFSET), a destination register (DST), a number of registers (NUM OF REGS), etc. In some examples, the GLIT format 300 may be implemented to include header data (e.g., CE, DMASK, CR0.0, etc.) associated with device access instruction data (e.g., SEND destination value data, SEND0 DESTINATION VALUES, SEND1 DESTINATION VALUES, etc.), which may include a value of a first register of an ARF associated with the GPU 110 (e.g., a CE register), a value of a second register of the ARF (e.g., a dispatch mask (DMASK) register), etc. Additionally or alternatively, there may be fewer or more records than the records 302 depicted in FIG. 3. Advantageously, the GLIT engine 102 may obtain the GLITs 112 of FIG. 1 that are based on and/or otherwise have the GLIT format 300, which may be used to improve profiling of the GPU 110.

In the illustrated example of FIG. 3, a GLIT based on the GLIT format 300 may store data associated with a plurality of hardware threads, such as the threads 208 of FIG. 2. For example, one of the GLIT(s) 112 based on the GLIT format 300 may store first data corresponding to a first one of the threads 208, second data corresponding to a second one of the threads 208, etc. In this example, the first data may correspond to NUM OF BBL RECORDS, BBL ID, HEADER, SEND0 DESTINATION VALUES, SEND1 DESTINATION VALUES, etc., which correspond to a first one of the threads 208 having an identifier of TID 0. In this example, the second data may correspond to NUM OF BBL RECORDS, BBL ID, HEADER, SEND0 DESTINATION VALUES, SEND1 DESTINATION VALUES, etc., which correspond to a second one of the threads 208 having an identifier of TID 1. In this example, GLIT format 300 may list the first data, the second data, etc., in sequential order. Alternatively, the GLIT format 300 may list the first data, the second data, etc., in any other order and/or format.

Turning back to the illustrated example of FIG. 1, the GLIT engine 102 retrieves (e.g., iteratively retrieves, periodically retrieves, etc.) the trace buffer 114 from the memory 116. In some examples, the GLIT engine 102 determines one or more operating parameters associated with the second kernel 108, and/or, more generally, the GPU 110. For example, the GLIT engine 102 may determine a GPU state, an execution time parameter, a busy time parameter, an idle time parameter, an occupancy time parameter, and/or a utilization parameter associated with the GPU 110. In some examples, the GLIT engine 102 adjusts operation of the GPU 110 based on the one or more operating parameters. For example, the GLIT engine 102 may instruct the CPU 118 to schedule an increased quantity of instructions to be performed by the GPU 110, a decreased quantity of instructions to be performed by the GPU 110, etc., based on the one or more operating parameters.

In the illustrated example of FIG. 1, the memory 116 includes one or more kernels, such as the second kernel 108, the trace buffer 114, and example GPU data 128. Alternatively, the memory 116 may not store the one or more kernels. In some examples, the memory 116 may be implemented by volatile memory, non-volatile memory (e.g., flash memory), etc., and/or a combination thereof. In some examples, the GPU data 128 corresponds to data generated by the GPU 110 in response to executing at least the second kernel 108. For example, the GPU data 128 can include graphics-related data, output information to a display device, etc.

Figure 4:
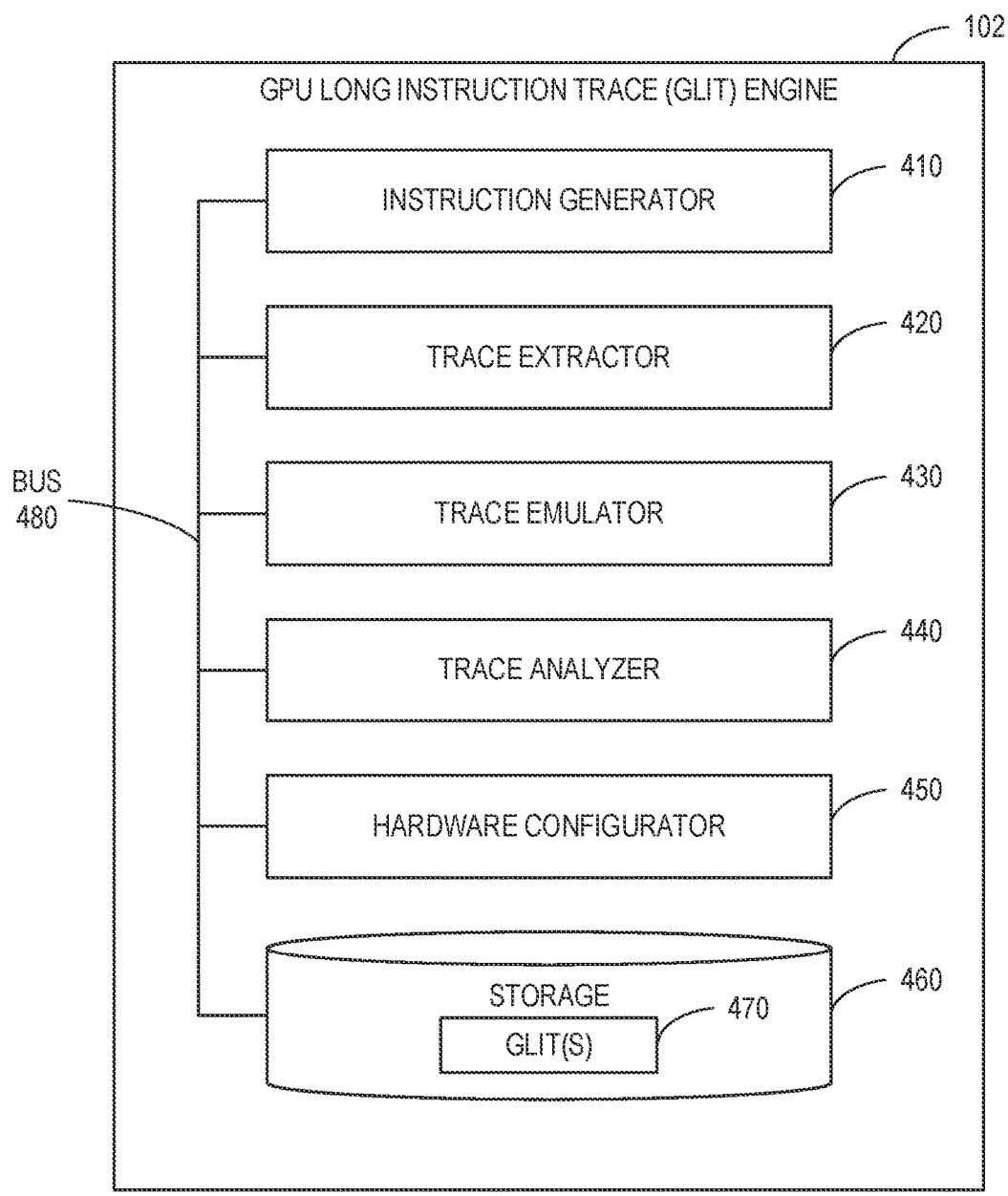
FIG. 4 is a block diagram of an example implementation of the GLIT engine of FIG. 1.

FIG. 4 is a block diagram of an example implementation of the GLIT engine 102 of FIG. 1 to improve operation of the GPU 110 of FIG. 1. In some examples, the GLIT engine 102 instruments binary shaders/kernels prior to sending them to the GPU 110. The GLIT engine 102 can collect the GLITs 112 of FIG. 1, which may be based on the GLIT format 300 of FIG. 3, from the memory 116 of FIG. 1. The GLIT engine 102 can emulate operation of the GPU 110 based on the records 126 stored in the GLITs 112. The GLIT engine 102 can determine operating parameters associated with the GPU 110, which may be used to determine improvement(s) to the operation of the GPU 110, the CPU 118, etc.

In the illustrated example of FIG. 4, the GLIT engine 102 includes an example instruction generator 410, an example trace extractor 420, an example trace emulator 430, an example trace analyzer 440, an example hardware configurator 450, and example storage 460. In this example, the storage 460 includes and/or otherwise stores example GLIT(s) 470. In this example, at least one of the instruction generator 410, the trace extractor 420, the trace emulator 430, the trace analyzer 440, the hardware configurator 450, and the storage 460 may be in communication with one(s) of each other via an example bus 480. For example, the bus 480 may be implemented by an Inter-Integrated Circuit (I2C) bus, a Serial Peripheral Interface (SPI) bus, and/or a Peripheral Component Interconnect (PCI) bus.

In the illustrated example of FIG. 4, the GLIT engine 102 includes the instruction generator 410 to instrument kernels such as the first kernel 106 of FIG. 1. For example, the instruction generator 410 may access the first kernel 106 (e.g., access the first kernel 106 from memory included in the CPU 118). The instruction generator 410 may instrument the first kernel 106 to generate the second kernel 108 of FIG. 1. For example, the instruction generator 410 may generate and insert binary code associated with the profiling instructions 104A-104C of FIG. 1 into the first kernel 106 to generate the second kernel 108. In some examples, the instruction generator 410 provides and/or otherwise transmits the second kernel 108 to the GPU driver 122 of FIG. 1. In such examples, in response to obtaining the second kernel 108 from the instruction generator 410, the GPU driver 122 may store the second kernel 108 in the memory 116 for later retrieval by the GPU 110.

In some examples, the instruction generator 410 implements means for inserting one or more profile routines, such as one or more of the profile instructions 104A-104C, in a kernel to be executed by one of the thread(s) 208 of the GPU 110. In some examples, the means for inserting may be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)) (e.g., field programmable gate array(s) (FPGA(s))). In some examples, the means for inserting may be implemented by at least one of block 1602 of FIG. 16 or block 1802 of FIG. 18.

In some examples, the instruction generator 410 implements means for generating binary code (e.g., binary instructions, machine readable instructions, etc.) based on the profiling instructions 104A-104C. In some examples, the instruction generator 410 implements means for inserting the generated binary code into the first kernel 106 at one or more places or positions within the first kernel 106 to generate the second kernel 108.

In the illustrated example of FIG. 4, the GLIT engine 102 includes the trace extractor 420 to retrieve and/or otherwise collect the GLITs 112, and/or, more generally, the trace buffer 114, from the memory 116 of FIG. 1. In some examples, the trace extractor 420 extracts the GLIT(s) 112 from the trace buffer 114 and/or extracting the records 126 from the GLITs 112. In some examples, the trace extractor 420 processes the GLITs 112 by traversing the GLITs 112 from a first position (e.g., a beginning) of the GLIT format 300 to a second position (e.g., an end) of the GLIT format 300 and extracting the records 126 along the way. For example, the trace extractor 420 can extract, identify, and/or otherwise determine a first one of the records 302 of FIG. 3, a second one of the records 302, etc., from the GLIT format 300 of FIG. 3.

In some examples, the trace extractor 320 extracts the records 126 from the GLITs 112 by decoding the binary kernel representation of the GLIT 112 to generate decoded binary data. In some examples, the trace extractor 320 extracts instruction identifiers and/or opcodes from the decoded binary data. For example, the trace extractor 320 can extract a SEND instruction, a READ SEND instruction, a branch instruction, etc., executed by the GPU 110, and a first opcode corresponding to the SEND instruction, a second opcode corresponding to the branch instruction, etc. In some examples, the trace extractor 320 sorts and/or otherwise groups one(s) of the records 126 based on at least one of an instruction identifier or an opcode that correspond to the one(s) of the records 126.

In some examples, the trace extractor 320 stores an association of the opcode and an emulation routine (e.g., machine readable code, a firmware and/or software routine, etc.). For example, the trace extractor 320 can identify that the first opcode corresponds to a first emulation routine. In such examples, the first emulation routine may be representative of an algorithm, machine readable instructions, etc., that, when executed, mimic and/or otherwise execute the same or substantially similar function as the SEND instruction that corresponds to the first opcode. In some examples, the trace extractor 320 stores the records 126, the instruction identifier, the opcode, the association, etc., in the storage 460.

In some examples, the trace extractor 420 implements means for identifying a first routine based on an identifier of a second routine executed by the GPU 110, the first routine based on an emulation of the second routine. In some examples, the trace extractor 420 implements means for extracting the GLITs 112 from the trace buffer 114 and/or extracting the records 126 from the GLITs 112. In some examples, the means for identifying and/or the means for extracting may be implemented by one or more analog or digital circuit(s), logic circuits, programmable processor(s), programmable controller(s), GPU(s), DSP(s), ASIC(s), PLD(s), and/or FPLD(s). In some examples, the means for identifying may be implemented by at least one of blocks 1602, 1604, 1606, 1608, of FIG. 16.

In the illustrated example of FIG. 4, the trace emulator 430 emulates and/or otherwise replays the GLITs 112 of FIG. 1 to effectuate analysis of the operation of the GPU 110. For example, the trace emulator 430 may replay execution of the second kernel 108 by the GPU 110 based on data stored in the GLITs 112. In some examples, the trace emulator 430 may replay one or more executions of the second kernel 108 by respective ones of the threads 208 of FIG. 2 based on the data stored in the GLITs 112 that correspond to the respective ones of the threads 208. In some examples, the trace emulator 430 executes emulation routines that simulate routines executed by the GPU 110. For example, the trace emulator 430 can retrieve one(s) of the data records 126 from the GLITs 112 and enter the retrieved one(s) of the data records 126 as arguments into a first emulation routine that may simulate execution of an instruction (e.g., an addition instruction, a subtraction instruction, a multiplication instruction, etc.) by the GPU 110. In such examples, the retrieved one(s) of the data records 126 can be the states of the GPU 110, such as values of registers of the ARF, the GRF, etc., associated with a thread of interest to process of the GPU 110.

In some examples, the trace emulator 430 instruments the emulation routines with callback routine(s) (e.g., callback instruction(s)) to facilitate analysis by the application 120 of FIG. 1, a developer or user associated with the CPU 118 of FIG. 1, etc. For example, the trace emulator 430 can include high-level language (HLL) instructions, which may be representative of machine readable instructions, into the emulation routines. In such examples, in response to the trace emulator 430 executing the instrumented emulation routines, the trace emulator 430 can invoke an API to provide and/or otherwise transmit output data in connection with execution of the instrumented emulation routines to an upper level analysis construct, such as the application 120. Advantageously, the trace emulator 430 may instrument and execute emulation routines to generate data and provide the data to a GPU profiling tool, which may be used to identify improvement(s) to operation of the GPU 110, the CPU 118, etc., and/or a combination thereof.

In some examples, the trace emulator 430 implements means for executing a first routine to determine a first value of a GPU state of the GPU, the first routine having (i) a first argument associated with the second routine and (ii) a second argument corresponding to a second value of the GPU state prior to executing the first routine. In some examples, the GPU state is a state of a first register in an ARF associated with a hardware thread of the GPU or a second register of a GRF of the hardware thread. In some examples, the identifier may be a first identifier extracted from an encoded binary file, and the means for executing is to determine the first value, the second value, and a hardware thread identifier from a long instruction trace generated by the hardware thread in response to an execution of the one or more profile routines by the hardware thread. In such examples, the first value can correspond to a GPU register value after an execution of the kernel by the hardware thread, the second value can correspond to the GPU register value prior to the execution of the kernel by the hardware thread, and the hardware thread identifier can identify the hardware thread.

In some examples, the means for executing is to determine one or more first register values of one or more respective first registers of a GRF of the GPU, determine one or more second register values of one or more respective second registers of an ARF of the GPU, and/or store the one or more first register values, the one or more second register values, one or more third register values, and a device access instruction (e.g., a SEND instruction, a READ SEND instruction, etc.) in a long instruction trace, such as a GLIT. In some examples, the one or more third registers can correspond to one or more respective destination registers associated with the device access instruction.

In some examples, the means for executing is to insert a first callback routine in an instrumented routine before an emulation routine, and the first callback routine may invoke a first application programming interface (API) to provide the second GPU state to an application. In some examples, the means for executing is to insert a second callback routine in the instrumented routine after the emulation routine, and the second callback routine may invoke the first API or a second API to provide the first GPU state to the application.

In some examples, the means for executing may be implemented by one or more analog or digital circuit(s), logic circuits, programmable processor(s), programmable controller(s), GPU(s), DSP(s), ASIC(s), PLD(s), and/or FPLD(s). In some examples, the means for executing may be implemented by at least one of block 1508 of FIG. 15, blocks 1612, 1614, 1616 of FIG. 16, or block 1714 of FIG. 17.

In the illustrated example of FIG. 4, the GLIT engine 102 includes the trace analyzer 440 determine one or more operating parameters associated with the GPU 110 of FIG. 1. In some examples, the trace analyzer 440 implements means for determining a GPU state, an execution time parameter, a busy time parameter, an idle time parameter, an occupancy time parameter, and/or a utilization parameter associated with the GPU 110. In some examples, the trace analyzer 440 determines the one or more operating parameters based on an emulation of operation of the GPU 110 by replaying the GLIT 112. For example, the trace analyzer 440 may determine a GPU state for a first one of the threads 208 of FIG. 2 by identifying a change in a register value of the GRF corresponding to the first one of the threads 208 in response to executing the second kernel 108. In some examples, the trace analyzer 440 can calculate an execution time parameter for the first one of the threads 208 by determining a quantity of time that the first one of threads needed to execute the second kernel 108. In some examples, the trace analyzer 440 can determine a utilization parameter for the first one of the threads 208 by calculating a ratio of a busy time of the first one of the threads 208 and a total amount of time for a time period of interest.

In some examples, the trace analyzer 440 determines aggregate operating parameters that are based on two or more of the threads 208. For example, the trace analyzer 440 can calculate an aggregate execution time parameter, an aggregate utilization parameter, etc. In such examples, the trace analyzer 440 can determine the aggregate utilization parameter by calculating a ratio of one or more busy ones of the threads 208 and a total quantity of the threads 208 for a time duration or time period of interest.

In some examples, trace analyzer 440 implements means for determining an operating parameter of a GPU based on a GPU state. For example, the means for determining may determine a utilization of the GPU based on the first GPU state. In some examples, the means for determining may be implemented by one or more analog or digital circuit(s), logic circuits, programmable processor(s), programmable controller(s), GPU(s), DSP(s), ASIC(s), PLD(s), and/or FPLD(s). In some examples, the means for determining may be implemented by at least one of block 1510 of FIG. 15 or block 1716 of FIG. 17.

In the illustrated example of FIG. 4, the GLIT engine 102 includes the hardware configurator 450 to adjust operation of the GPU 110 and/or the CPU 118 based on the GLIT 112, the one or more operating parameters associated with the GLIT 112, etc. In some examples, the hardware configurator 450 delivers, provides, and/or otherwise communicates the one or more operating parameters to the application 120 of FIG. 1. For example, the hardware configurator 450 can report and/or otherwise communicate a GPU state, a hardware thread utilization, an execution unit utilization, etc., associated with the GPU 110 to developers (e.g., software developers, processor designers, GPU engineers, etc.) with a performance analysis tool (e.g., a GPU profiling tool), a graphical user interface (GUI) included in the performance analysis tool, etc. In such examples, the developers may improve their software by improving, for example, load balance of computational tasks, provisioning different data distribution among hardware threads, execution units, etc., of the GPU 110, etc.

In some examples, the hardware configurator 450 can invoke hardware, software, firmware, and/or any combination of hardware, software, and/or firmware (e.g., the GPU driver 122, the CPU 118, etc.) to improve operation of the GPU 110. For example, the hardware configurator 450 can generate and transmit an instruction (e.g., a command, one or more machine readable instructions, etc.) to the GPU driver 122, the CPU 118, etc., of FIG. 1. In response to receiving and/or otherwise executing the instruction, the GPU driver 122, the CPU 118, etc., may be invoked to determine whether to adjust an operation of the GPU 110. For example, the GPU driver 122, and/or, more generally, the CPU 118, may be called to adjust scheduling of computational tasks, jobs, workloads, etc., to be executed by the GPU 110 based on the one or more operating parameters.

In some examples, the hardware configurator 450 invokes and/or otherwise instructs the GPU driver 122 to analyze one or more operating parameters based on the GLIT(s) 112. For example, the GPU driver 122, and/or, more generally, the CPU 118, may compare an operating parameter to an operating parameter threshold (e.g., a GPU state threshold, an execution time threshold, a busy time threshold, an idle time threshold, a utilization threshold, etc.). For example, when invoked, the GPU driver 122 and/or, more generally, the CPU 118, may determine that a utilization of the GPU 110 is 95% corresponding to the GPU 110 being busy 95% of a measured time interval. The GPU driver 122 may compare the utilization of 95% to a utilization threshold of 80% and determine that the GPU 110 should not accept more computational tasks based on the utilization satisfying the utilization threshold (e.g., the utilization is greater than the utilization threshold). As used herein, a job or a workload may refer to a set of one or more computational tasks to be executed by one or more hardware threads, such as the threads 208 of FIG. 2.

In some examples, when invoked by the hardware configurator 450, the GPU driver 122, and/or, more generally, the CPU 118, may determine that a utilization of the GPU 110 is 40%. The GPU driver 122 may compare the utilization of 40% to the utilization threshold of 80% and determine that the GPU 110 has available bandwidth to execute more computational tasks. For example, the GPU driver 122 may determine that the utilization of 40% does not satisfy the utilization threshold of 80%. In response to determining that the utilization of the GPU 110 does not satisfy the utilization threshold, the GPU driver 122 may adjust or modify a schedule of resources to facilitate tasks to be executed by the GPU 110. For example, the GPU driver 122 may increase a quantity of computational tasks that the GPU 110 is currently executing and/or will be executing based on the utilization parameter, which may be determined based on the GLIT(s) 112 of FIG. 1.

In some examples, the hardware configurator 450 implements means for improving and/or otherwise optimizing resource scheduling (e.g., hardware scheduling, memory allocation, etc.) by the CPU 118. For example, developers may develop and/or improve hardware scheduling functions or mechanisms by analyzing the one or more operating parameters associated with the GPU 110.

In some examples, the hardware configurator 450 implements means for controlling workload of the GPU based on the first value of the GPU state. In some examples, the means for controlling is to, in response to determining that an operating parameter (e.g., a busy time, a utilization, etc.) does not satisfy a threshold, cause at least one of an adjustment to a routine (e.g., one or more instructions included in the second kernel 108) or an increased number of computational tasks to be executed by the GPU 110 to control the workload of the GPU 110. In some examples, the means for controlling may be implemented by one or more analog or digital circuit(s), logic circuits, programmable processor(s), programmable controller(s), GPU(s), DSP(s), ASIC(s), PLD(s), and/or FPLD(s). In some examples, the means for controlling may be implemented by at least one of blocks 1512, 1514 of FIG. 15 or block 1720 of FIG. 17.

In the illustrated example of FIG. 4, the GLIT engine 102 includes the storage 460 to record data, such as the GLIT(s) 470. For example, the GLIT(s) 470 may include one or more of the GLIT(s) 112 of FIG. 1. In such examples, the GLIT(s) 470 may be stored in the storage 460 in an encoded binary format, such as the GLIT format 300 of FIG. 3. In some examples, the storage 460 records and/or otherwise stores one(s) of the records 126 of FIG. 1, which may include instruction identifiers, opcodes, and/or data associated with one(s) of the instruction identifiers and/or one(s) of the opcode(s), one or more emulation routines, one or more associations between one(s) of the one or more emulation routines and one(s) of the instruction identifiers and/or one(s) of the opcodes, etc., and/or a combination thereof In some examples, the storage 460 stores instrumented versions of the emulation routines, such as emulation routines that may include callback routines to invoke data transfer via one or more APIs.

The storage 460 of this example may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The storage 460 may additionally or alternatively be implemented by one or more double data rate (DDR) memories, such as DDR, DDR2, DDR3, DDR4, mobile DDR (mDDR), etc. The storage 460 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the storage 460 is illustrated as a single storage, the storage 460 may be implemented by any number (e.g., at least one storage disc or device) and/or type(s) of storage. Furthermore, the data stored in the storage 460 may be in any data format such as, for example, binary data, comma delimited data, tab delimited data, structured query language (SQL) structures, etc.

While an example manner of implementing the GLIT engine 102 of FIG. 1 is illustrated in FIG. 4, one or more of the elements, processes and/or devices illustrated in FIG. 4 may be combined, divided, re-arranged, omitted, eliminated and/or implemented in any other way. Further, the example instruction generator 410, the example trace extractor 420, the example trace emulator 430, the example trace analyzer 440, the example hardware configurator 450, the example storage 460, the example GLIT(s) 470, and/or, more generally, the example GLIT engine 102 of FIG. 1 may be implemented by hardware, software, firmware and/or any combination of hardware, software and/or firmware. Thus, for example, any of the example instruction generator 410, the example trace extractor 420, the example trace emulator 430, the example trace analyzer 440, the example hardware configurator 450, the example storage 460, the example GLIT(s) 470 and/or, more generally, the example GLIT engine 102 could be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)) and/or field programmable logic device(s) (FPLD(s)) (e.g., field programmable gate array(s) (FPGA(s))). When reading any of the apparatus or system claims of this patent to cover a purely software and/or firmware implementation, at least one of the example instruction generator 410, the example trace extractor 420, the example trace emulator 430, the example trace analyzer 440, the example hardware configurator 450, the example storage 460, and/or the example GLIT(s) 470 is/are hereby expressly defined to include a non-transitory computer readable storage device or storage disk such as a memory, a DVD, a CD, a Blu-ray disk, etc., including the software and/or firmware. Further still, the example GLIT engine 102 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
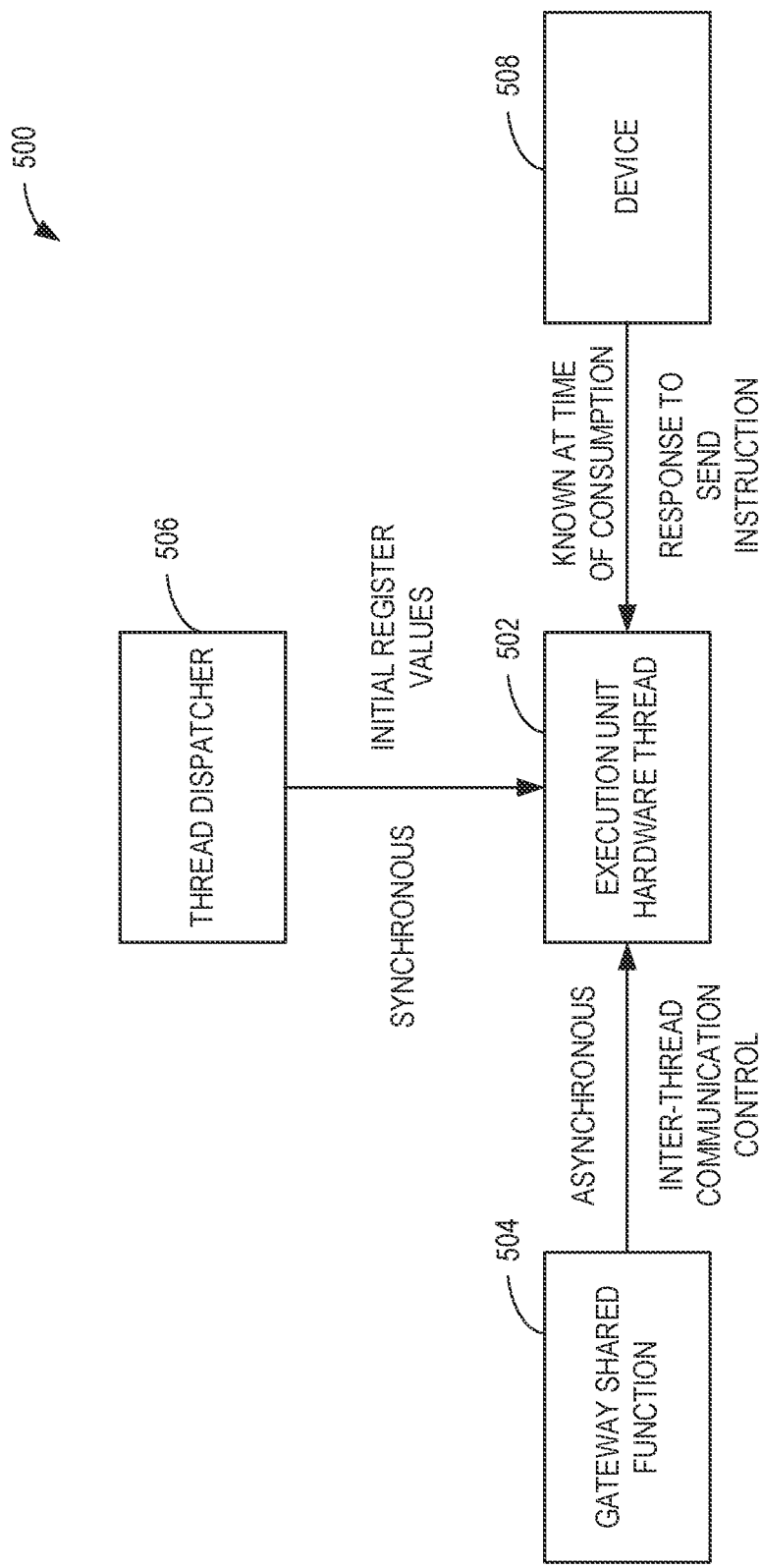
FIG. 5 is an illustration of an example system that may implement the example GPU of FIG. 1 and/or the example GPU portion of FIG. 2 to control operation of an example execution unit hardware thread.

FIG. 5 is an illustration of an example system 500 that may implement the GPU 110 of FIG. 1 or portion(s) thereof and/or the GPU slice 200 of FIG. 2 or portion(s) thereof. In this example, the system 500 may be utilized to control operation of an example execution unit hardware thread 502. In this example, the execution unit hardware thread 502 may implement one of the threads 208 of FIG. 2.

In the illustrated example of FIG. 5, the system 500 includes the execution unit hardware thread 502, an example gateway shared function 504, an example thread dispatch 506, and an example device 508. In this example, the system 500 may depict different mechanisms, techniques, etc., for modifying and/or otherwise controlling operation of the execution unit hardware thread 502.

In the illustrated example of FIG. 5, the system 500 includes the gateway shared function 504 to implement inter-thread communication control. In this example, the gateway shared function 504 communicates with the execution unit hardware thread 502 on an asynchronous basis. Alternatively, the gateway shared function 504 may interact with the execution unit hardware thread 502 on a synchronous basis. In some examples, the gateway shared function 504 may be implemented as hardware to effectuate thread-to-thread (e.g., hardware thread-to-hardware thread) synchronization. In some examples, the gateway shared function 504 can facilitate remote register write operations. For example, the gateway shared function 504 can obtain a write request from a first register of a first one of the threads 208 of FIG. 2 and forward the write request to a second register of a second one of the threads 208 of FIG. 2.

In some examples, the gateway shared function 504 implements active thread-to-thread communication based on direct register access. For example, a first thread (e.g., a requester thread) may be capable of writing into the GRF register space of another thread (e.g., a recipient thread). Such direct register access between two threads in a multi-processor environment may be referred to as remote register access. Remote register access may implement a read operation or write operation. In some examples, an architecture of the GPU 110 may support remote register write, but not remote register read (natively). For example, the gateway shared function 504 facilitates such remote register write via message passing. In some examples, the requester thread may send a message to the gateway shared function 504 requesting a write to the recipient thread's GRF register space. The gateway shared function 504 may send a write-back message to the recipient thread to complete the register write on behalf of the requester. The requester thread and the recipient thread may be on the same execution unit or on different execution unit(s) of the GPU 110.

In the illustrated example of FIG. 5, the system 500 includes the thread dispatcher 506 to provide initial register values as an input payload (e.g., an input data payload) to the execution unit hardware thread 502. In some examples, the thread dispatcher 506 may be implemented as a functional unit in hardware to arbitrate thread initiation requests from the fixed function units 207 of FIG. 2 and instantiate the thread(s) 208 of the execution units 204. For example, the thread dispatcher 506 may determine on which one(s) of the execution units 204 and which thread(s) 208 of the execution units 204 to dispatch a job or software thread. In some examples, the thread dispatcher 506 may load initial GPU state(s) into an idle one of the thread(s) 208 and start its execution based on the determination(s). In this example, the thread dispatcher 506 provides the initial register values to register files, such as the GRF and/or the ARF of the execution unit hardware thread 502, on a synchronous basis. In some examples, the thread dispatcher 506 may implement the local thread dispatcher 220 of FIG. 2.

In the illustrated example of FIG. 5, the system 500 includes the device 508 to execute responses to device access instructions from the execution unit hardware thread 502. In some examples, the device 508 may implement the sampler 216 of FIG. 2, the data port 218 of FIG. 2, the shared local memory 214 of FIG. 2, and/or the cache memory 210 of FIG. 2. In some examples, the device 508 facilitates execution of a device access request. For example, the device access request may be implemented by any instruction that causes the execution unit hardware thread 502 to write data to, and/or read data from, the device 508. In some examples, the device access request may be implemented by a SEND instruction, a READ SEND instruction, a LOAD instruction, etc. For example, the execution unit hardware thread 502 may execute a device access request by generating a SEND instruction in response to completing an execution of a kernel, such as the second kernel 108 of FIG. 1. In this example, the SEND instruction is known at the time of consumption because the SEND instruction is generated in response to completing an execution of a kernel.

In some examples, in response to executing a SEND instruction, the execution unit hardware thread 502 may transmit one or more register values associated with the execution unit hardware thread 502 to the device 508. In some examples, in response to executing a READ SEND instruction, the execution unit hardware thread 502 may request one or more register values stored in the device 508. In such examples, the device 508 may prepare a response to the READ SEND instruction by transmitting data read from the requested registers stored in the device 508 to the execution unit hardware thread 502.

In some examples, the GLIT(s) 112 of FIG. 1 may capture the different mechanisms, techniques, etc., to modify and/or otherwise control operation of the execution unit hardware thread 502. For example, the GLIT(s) 112 may include first GPU states of the execution unit hardware thread 502 at a first time, which may correspond to first values of the ARF, first values of the GRF, etc., of the execution unit hardware thread 502 during an initialization state, such as receiving initial register values from the thread dispatcher 506 in preparation for executing the second kernel 108. In some examples, the GLIT(s) 112 may include second GPU states of the execution unit hardware thread 502 at a second time after the first time. The second GPU states may correspond to second values of the ARF, second values of the GRF, etc., in response to the gateway shared function 504 executing one or more remote register write operations from different one(s) of the threads 208 of FIG. 2. In some examples, the one or more remote register write operations may change one or more of the first values of the GRF into one or more of the second values. In some examples, the GLIT(s) 112 may include third GPU states of the execution unit hardware thread 502 at a third time after the second time. The third GPU states may correspond to third values of the ARF, third values of the GRF, etc., in response to the execution unit hardware thread 502 generating a SEND instruction to invoke the device 508 to read the data from the ARF, the GRF, etc.

Figure 6:
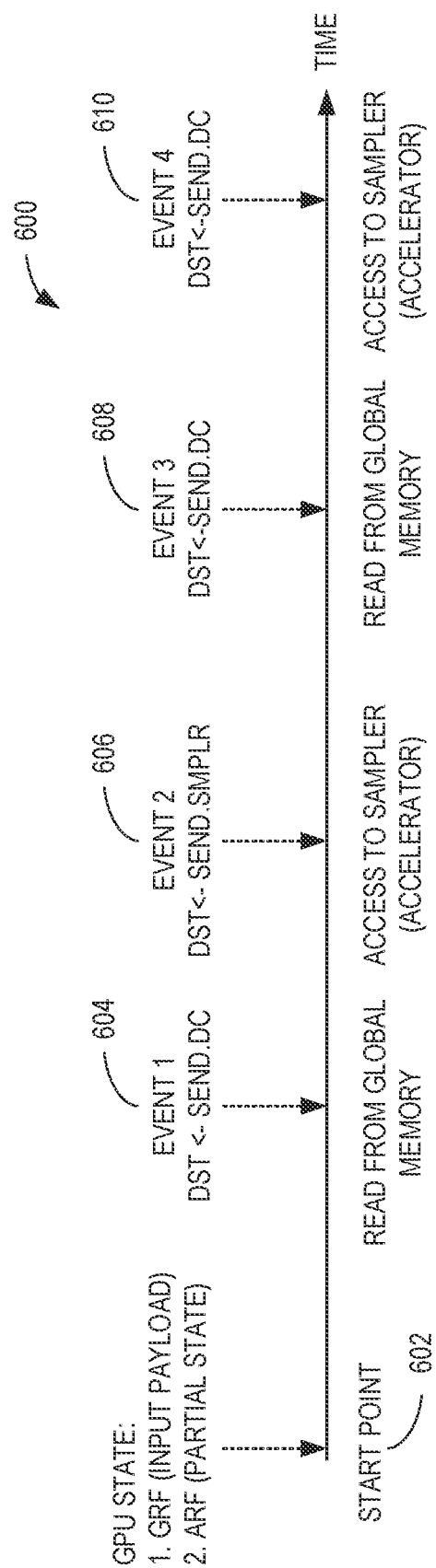
FIG. 6 is an illustration of an example GPU long instruction trace (GLIT) for the example GPU of FIG. 1 and/or the example GPU portion of FIG. 2.

FIG. 6 is an illustration of an example GLIT 600 for the GPU 110 of FIG. 1, the GPU slice 200 of FIG. 2, and/or the execution unit hardware thread 502 of FIG. 5. In some examples, the GLIT 600 of FIG. 6 may implement one(s) of the GLIT(s) 112 of FIG. 1. In some examples, the GLIT 600 may be encoded in a binary kernel having a format based on the GLIT format 300 of FIG. 3. For example, the GLIT 600 may be implemented by an encoded binary file representative of an example execution of the kernel 108 of FIG. 1 by one of the threads 208 of FIG. 2.

In some examples, one of the GLIT(s) 112 of FIG. 1 can include a plurality of binary kernels. In some examples, the GLIT 600 may implement one of the plurality of binary kernels. Advantageously, because the second kernel 108 of FIG. 1 may be distributed to plurality of the threads 208 of FIG. 2 for execution, the plurality of binary kernels may implement a multi-threaded GPU trace.

In this example, the GLIT 600 may implement a LIT for a single software thread running on a hardware thread (e.g., one the threads 208 of FIG. 2, the execution unit hardware thread 502 of FIG. 5, etc.) of an example processor, such as the GPU 110 of FIG. 1, the GPU slice 200 of FIG. 2, etc. In some examples, a GLIT for an execution unit, such as the execution unit 204 of FIG. 2, may be implemented by a group or collection of GLITs for ones of the threads 208 of the execution unit 204. In some examples, a GLIT for a subslice, such as the subslice 202 of FIG. 2, may be implemented by a group or collection of GLITs for ones of the execution units 204.

In the illustrated example of FIG. 3, the GLIT 600 begins at an example start point 602 with the GPU having states (e.g., GPU states) based on initial values of registers of an ARF of the hardware thread and initial values of registers of a GRF of the hardware thread. In this example, the initial values of the registers of the GRF may be for an entirety of the registers of the GRF. Alternatively, the initial values of the registers of the GRF may be for a partial number of the registers of the GRF.

In this example, the initial values of the registers of the ARF may be for a partial number of the registers of the ARF, such as for a first register value corresponding to a dispatch mask, a second register value corresponding to a hardware thread identifier (TID), a third register value corresponding to an execution mask, a fourth register value corresponding to a control register, etc., of the ARF. Alternatively, the initial values of the registers of the ARF may be for an entirety of the registers of the ARF.

After the GPU states are initialized at the start point 602, the GLIT 600 includes a first example event (EVENT 1) 604 at a first time after the start point 602, a second example event (EVENT 2) 606 at a second time after the first time, a third example event (EVENT 3) 608 at a third time after the second time, and a fourth example event (EVENT 4) 610 at a fourth time after the third time. In this example, the events 604, 606, 608, 610 are READ SEND instructions, which may be representative of sending a message to external hardware (e.g., the device 508 of FIG. 5) to the hardware thread, such as the sampler 216 of FIG. 2 and/or the cache memory 210. For example, the first event 604 may be representative of a read from global memory, such as the cache memory 210, with a value of a destination register of the hardware thread represented by DST. In another example, the second event 606 may be representative of an access to a sampler, such as the sampler 216 of FIG. 2, with a value of a destination register of the hardware thread represented by DST. Additionally or alternatively, a GLIT, such as the GLIT 600 of FIG. 6, may include fewer or more events than those depicted in FIG. 6.

Advantageously, information in connection with the GLIT 600 of FIG. 6 may be encoded in a binary format, such as the GLIT format 300 of FIG. 3, and stored in the binary format in the memory 116 for later access and/or retrieval by a processor, such as the CPU 118 of FIG. 1. For example, the initial values of the GPU states, such as the GRF register values, the ARF register values, etc., at the start point 602 may be encoded using the GLIT format 300. In some examples, one(s) of the events 604, 606, 608, 610 may be stored using the GLIT format 300. In such examples, register values, such as values of the ARF and/or GRF registers, prior to and/or after one(s) of the events 604, 606, 608, 610 may be stored using the GLIT format 300.

Figure 7:
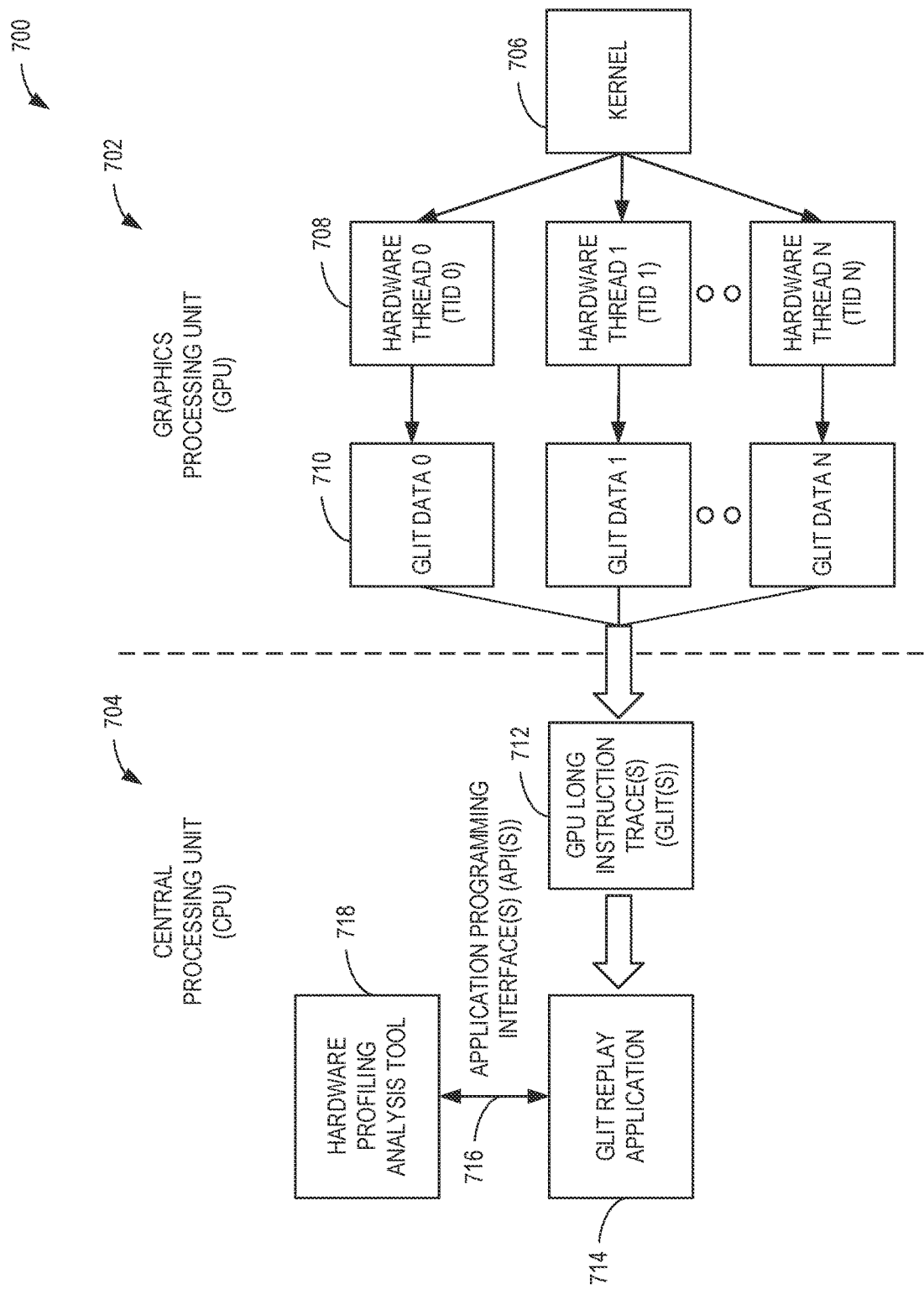
FIG. 7 is an illustration of an example system to generate and analyze the GLIT of FIG. 6.

FIG. 7 is an illustration of an example system 700 to generate and analyze the GLIT 600 of FIG. 6. The system 700 of FIG. 7 includes an example GPU 702 and an example CPU 704. In some examples, the GPU 702 may implement the GPU 110 of FIG. 1 and/or the GPU slice 200 of FIG. 2. In some examples, the CPU 704 may implement the CPU 118 of FIG. 1.

In the illustrated example of FIG. 7, the GPU 702 executes an example kernel 706. In this example, the kernel 706 is an instrumented kernel, which may implement the second kernel 108 of FIG. 1. In this example, the kernel 706 is distributed and/or otherwise scheduled for execution by a plurality of example hardware threads 708 of the GPU 702. For example, each of the threads 708 may be implemented by one of the threads 208 of FIG. 2. In this example, the first one of the hardware threads 708 may have a hardware thread identifier of TID 0, the second one of the hardware threads 708 may have a hardware thread identifier of TID 1, an Nth one of the hardware threads 708 may have a hardware thread identifier of TID N, etc.

In the illustrated example of FIG. 7, the hardware threads 708 may execute an instance of the kernel 706 and generate respective example GLIT data 710. For example, the first one of the hardware threads 708 may generate and/or otherwise output GLIT DATA 0, the second one of the hardware threads 708 may generate and/or otherwise output GLIT DATA 1, the Nth one of the hardware threads 708 may generate and/or otherwise output GLIT DATA 2, etc. In some examples, the GPU 702 may store the GLIT data 710 as the records 126 in the trace buffer 114 of the memory 116 of FIG. 1.

In some examples, the GLIT data 710 may include at least one of GPU state(s) (e.g., one or more ARF register values, one or more GRF register values, etc., of the hardware thread) or data associated with the kernel 706. For example, the data associated with the kernel 706 can include a GPU instruction included in the kernel 706, an opcode corresponding to the instruction, an instruction identifier corresponding to the instruction, etc. In some examples, a portion of the GLIT data 710 may implement one(s) of the records 126 of FIG. 1, one(s) of the records 302 of FIG. 3, etc. For example, a first portion of GLIT DATA 0 may include an instruction of the kernel 706, which may be stored by the GPU 702 in the trace buffer 114 as INST_DECODE INST0 of the GLIT format 300 of FIG. 3.

In some examples, the CPU 704 obtains and/or otherwise retrieves the GLIT data 710 from a buffer stored in memory, such as the trace buffer 114 stored in the memory 116 of FIG. 1, and generates example GLIT(s) 712 based on the GLIT data 710. In some examples, the GLIT(s) 712 may implement the GLIT(s) 112 of FIG. 1. In some examples, the CPU 704 may generate a first one of the GLIT(s) 712 that corresponds to the first one of the hardware threads 708 based on GLIT DATA 0, a second one of the GLIT(s) 712 that corresponds to the second one of the hardware threads 708 based on GLIT DATA 1, a third one of the GLIT(s) 712 that corresponds to the third one of the hardware threads 708 based on GLIT DATA N, etc. In such examples, the first one of the GLIT(s) 712, the second one of the GLIT(s) 712, the third one of the GLIT(s) 712, etc., may be generated by arranging and/or otherwise organizing respective one(s) of the GLIT data 710 into a file (e.g., a binary file) based on the GLIT format 300 of FIG. 3. In some examples, the CPU 704 may generate the first one of the GLIT(s) 712 by arranging and/or otherwise organizing GLIT DATA 0, GLIT DATA 1, GLIT DATA N, etc., into a binary file based on the GLIT format 300.

In this example, the CPU 704 implements an example GLIT replay application 714 to replay an execution of the kernel 706 by the GPU 702 based on the GLIT(s) 712 by simulating the execution of the kernel 706. In some examples, the GLIT replay application 714 may implement the application 120 of FIG. 1. For example, the GLIT replay application 714 can be a software application that instruments emulation routines (e.g., emulation instructions, emulation software routines, etc.) that correspond to a simulation of GPU routines (e.g., GPU instructions, GPU kernel routines, etc.) utilized to execute the kernel 706.

In some examples, the instrumented emulation routines invoke example API(s) 716 to communicate and/or otherwise transmit data to an example hardware profiling analysis tool 718. For example, the GLIT replay application 714 can instrument a first emulation routine with a first callback routine before an execution of an instruction (e.g., an instruction that simulates an execution of the kernel 706) included in the first emulation routine and/or a second callback routine after the execution of the instruction.

In some examples, in response to executing the first callback routine, the GLIT replay application 714 can invoke one of the API(s) 716 to provide a first GPU state corresponding to a first value of a GRF register of the GPU 702 to the hardware profiling analysis tool 718 prior to the execution of the instruction included in the first emulation routine. In some examples, in response to executing the second callback routine, the GLIT replay application 714 can invoke one of the API(s) 716 to provide a second GPU state corresponding to a second value of the GRF register to the hardware profiling analysis tool 718 after the execution of the instruction included in the first emulation routine. In some examples, the first GPU state may be the same as the second GPU state, namely, the GRF register did not change in response to executing the first emulation routine. In some examples, the first GPU state may be different than the second GPU state, namely, the GRF register changed in response to executing the first emulation routine to indicate that the execution of the kernel 706 modified the GRF register.

In some examples, the hardware profiling analysis tool 718 may be implemented by the application 120 of FIG. 1. For example, the hardware profiling analysis tool 718 can be a software application that analyzes the replay and/or otherwise emulation of the execution of the kernel 706 to identify improvement(s) to operation of at least one of the GPU 702 or the CPU 704 based on the replay and/or otherwise emulation of the execution of the kernel 706. In some examples, the hardware profiling analysis tool 718 may be implemented by one or more DLLs. Additionally or alternatively, the hardware profile analysis tool 718 may analyze operation of any other type of hardware processor, such as a neural network processor, a VPU, etc.

In some examples, the hardware profiling analysis tool 718 can identify the improvement(s) based on the change in the GRF register as described above. In some examples, the hardware profiling analysis tool 718 can determine that the change in the GRF register is not a typical or expected result, which may inform a developer to modify the second kernel 108 for improved execution by the GPU 702. In some examples, the hardware profiling analysis tool 718 can determine that no detected change in the GRF register may indicate that the distribution of the kernel 706 to hardware thread(s) of the GPU 702 is not an efficient distribution, which may inform a developer to modify scheduling of the second kernel 108 to improve the distribution of the kernel 706.

Figure 8:
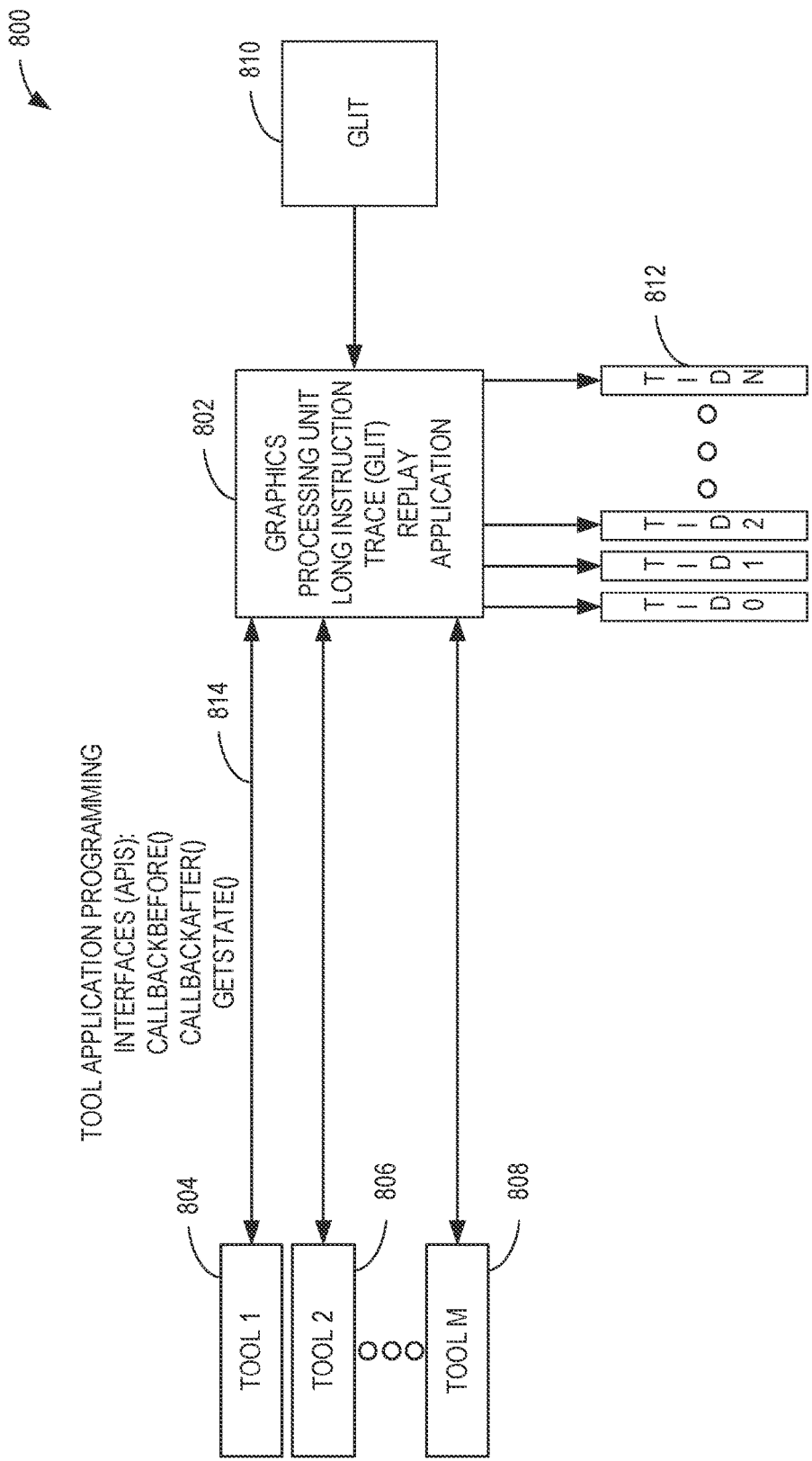
FIG. 8 is an illustration of an example system to emulate and analyze the GLIT of FIG. 6.

FIG. 8 is an illustration of another example system 800 to emulate and analyze the GLIT 600 of FIG. 6. For example, the system 800 of FIG. 8 may implement the system 700 of FIG. 7 or portion(s) thereof. In this example, the system 800 includes an example GLIT replay application 802 and a plurality of example tools 804, 806, 808. For example, the GLIT replay application 802 may implement the GLIT replay application 714 of FIG. 7. In some examples, the tools 804, 806, 808 may implement the hardware profiling analysis tool 718 of FIG. 7. For example, one or more of the tools 804, 806, 808 may be implemented as software application(s) to analyze execution of a kernel by a GPU by replaying the execution using data stored and/or otherwise included in the GLIT 810. In some examples, one or more of the tools 804, 806, 808 may be implemented as one or more DLLs to effectuate different analysis of the execution of the kernel. For example, a first tool 804 of the tools 804, 806, 808 may profile the execution of the kernel using a first set of analysis routines, functions, etc., a second tool 806 of the tools 804, 806, 808 may profile the execution of the kernel using a second set of analysis routines, functions, etc., and/or a third tool 808 of the tools 804, 806, 808 may profile the execution of the kernel using a third set of analysis routines, functions, etc., where one or more of the first set, the second set, and/or the third set may be different from each other.

In the illustrated example of FIG. 8, the GLIT replay application 802 obtains an example GLIT 810. For example, the GLIT 810 may implement the GLIT(s) 112 of FIG. 1, the GLIT(s) 470 of FIG. 4, the GLIT 600 of FIG. 6, and/or the GLIT(s) 712 of FIG. 7. In some examples, the GLIT 810 may be an encoded binary kernel and the GLIT replay application 802 may decode the GLIT 810. For example, the GLIT replay application 802 may unpack and/or otherwise extract data stored in a binary format, such as the GLIT format 300 of FIG. 3. In some examples, the GLIT replay application 802 can associate portion(s) of the extracted data to example hardware thread identifiers (TID0 to TIDN) 812 of a GPU, such as the GPU 110 of FIG. 1, a slice of a GPU such as the GPU slice 200 of FIG. 2, etc.

In the illustrated example of FIG. 8, the GLIT replay application 802 is in communication with one(s) of the tools 804, 806, 808 via one or more example APIs 814. For example, the GLIT replay application 802 can instrument emulation routines that simulate execution of a GPU kernel by including callback routines before and/or after execution of the instrumented emulation routines. In some examples, the callback routines may include a "CALLBACKBEFORE( )" callback routine that, when executed, may invoke a first one of the APIs 814 to provide data, such as a GPU state, to corresponding one(s) of the tools 804, 806, 808 prior to executing an instruction included in the instrumented emulation routine. For example, the "CALLBACKBEFORE( )" callback routine may invoke a callback routine "GETSTATE( )" to provide the GPU state. In some examples, the callback routines may include a "CALLBACKAFTER( )" callback routine that, when executed, may invoke a second one of the APIs 814 to provide data, such as a GPU state, to corresponding one(s) of the tools 804, 806, 808 after executing the instruction included in the instrumented emulation routine. For example, the "CALLBACKAFTER( )" callback routine may invoke a callback routine "GETSTATE( )" to provide the GPU state. Additionally or alternatively, fewer or more of the APIs 814 may be used than the APIs 814 depicted in FIG. 8. Additionally or alternatively, one or more of the APIs 814 may be different than the APIs 814 depicted in FIG. 8. For example, one or more of the APIs 814 may be implemented with a PIN API, which may be used to insert machine readable code (e.g., C code, C++ code, etc.) in one or more places of a kernel.

Figure 9:
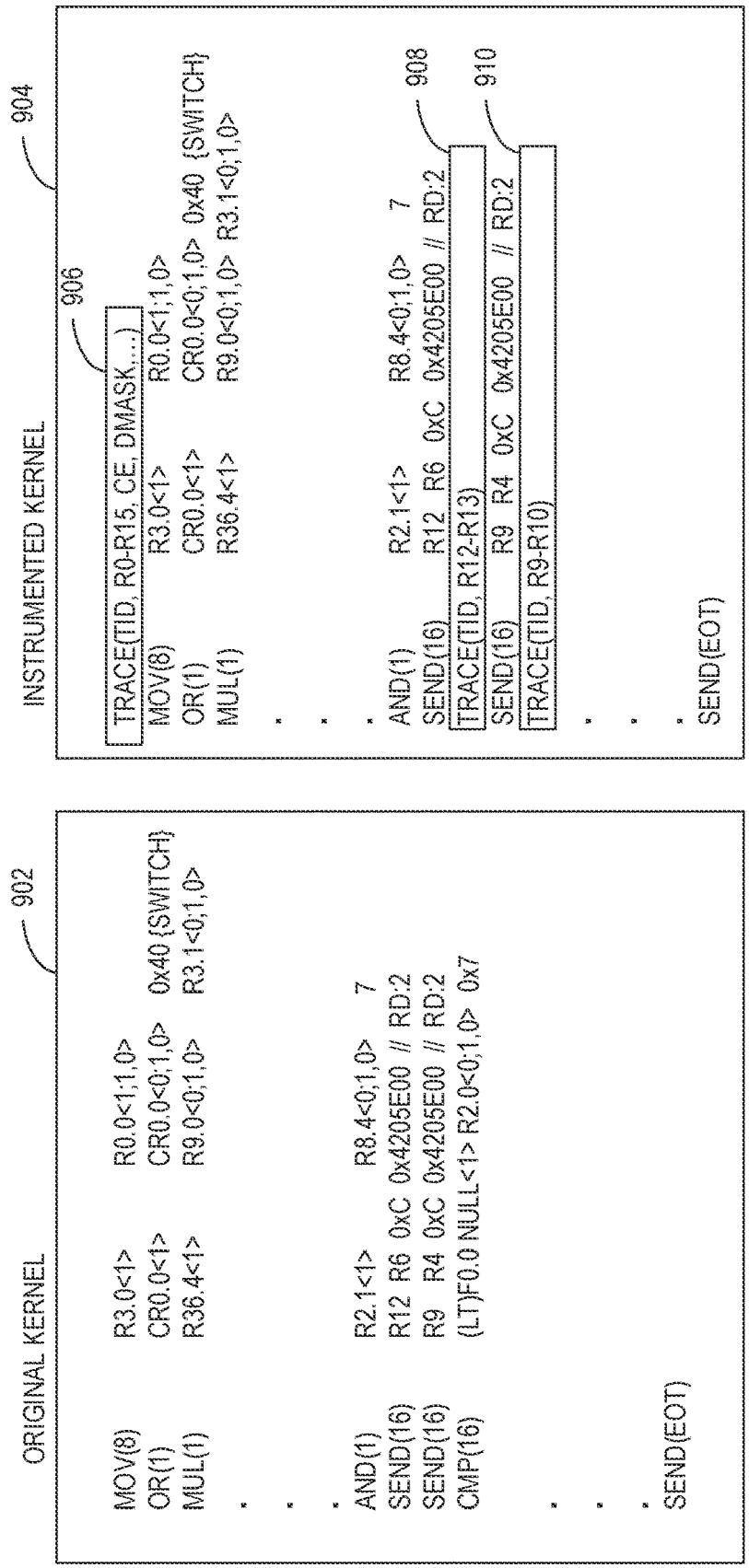
FIG. 9 depicts an example kernel and an example instrumented kernel.

FIG. 9 depicts a first example kernel 902 and a second example kernel 904 that may be executed by a GPU, such as the GPU 110 of FIG. 1, a slice of a GPU such as the GPU slice 200 of FIG. 2, and/or the GPU 702 of FIG. 7. In this example, the first kernel 902 may implement a non-instrumented kernel. For example, the first kernel 902 may implement the first kernel 106 of FIG. 1. In this example, the second kernel 904 may implement an instrumented kernel, such as the second kernel 108 of FIG. 1 and/or the kernel 706 of FIG. 7. In this example, the second kernel 904 may correspond to an instrumented version of the first kernel 902.

In the illustrated example of FIG. 9, the first kernel 902 includes example instructions, such as a move instruction (MOV), an or instruction (OR), a multiplication (MUL) instruction, and an and (AND) instruction. In response to executing the MOV, OR, MUL, and AND instructions, the first kernel 902 causes execution of a first SEND instruction (SEND) and a second SEND instruction (SEND). In this example, the SEND instructions are read instructions from global memory, such as the cache memory 210 of FIG. 2, the device 508 of FIG. 5, etc. In this example, the first SEND instruction implements a first read operation of two 32-byte wide registers (e.g., register r12 of the global memory being 32-bytes wide, r13 of the global memory being 32-bytes wide, etc.). In this example, the second SEND instruction implements a second read operation of two 32-byte wide registers (e.g., registers r9 and r10 of the global memory).

In the illustrated example of FIG. 9, the second kernel 904 includes the MOV, OR, MUL, AND, and SEND instructions of the first kernel 902. In this example, the second kernel 904 includes example instrumentation instructions (TRACE) 906, 908, 910 to generate an example GLIT, such as the GLIT(s) 112 of FIG. 1, the GLIT 600 of FIG. 6, etc. In this example, the instrumentation instructions 906, 908, 910 includes a first example trace instruction (TRACE(TID, R0-R15, CE, DMASK, . . . )) 906 to trace an entire input payload of GRF registers and a portion or subset of ARF registers associated with a hardware thread of the GPU that is to execute the second kernel 904. For example, the first trace instruction 906 can read registers r0-r15 of the GRF of the hardware thread and at least the CE and DMASK registers of the ARF of the hardware thread. In such examples, the input payload represented by r0-r15 may include sixteen 32-byte registers (e.g., r0, r1, r2, . . . r15).

In the illustrated example, the instrumentation instructions 906, 908, 910 include a second example trace instruction 908 to trace the resulting destination values after execution of the first SEND instruction. For example, in response to executing the first SEND instruction, the second trace instruction 908 can obtain the resulting values of the destination registers (e.g., r12 and r13 of the global memory). In some examples, the second trace instruction 908, when executed, can generate a trace record (e.g., one of the records 126 of FIG. 1, one of the records 302 of FIG. 3, etc.) to include a TID of the hardware thread that executed the second kernel 904 and a first offset (e.g., a first offset value) of the original instruction within the first kernel 902.

In the illustrated example, the instrumentation instructions 906, 908, 910 include a third example trace instruction 910 to trace the resulting destination values after execution of the second SEND instruction. For example, in response to executing the second SEND instruction, the third trace instruction 910 can obtain the resulting values of the destination registers (e.g., r9 and r10 of the global memory). In some examples, the third trace instruction 910, when executed, can generate a trace record (e.g., one of the records 126 of FIG. 1, one of the records 302 of FIG. 3, etc.) to include a TID of the hardware thread that executed the second kernel 904 and a second offset (e.g., a second offset value) of the original instruction within the first kernel 902. Advantageously, the order of the trace records may correspond to the offset zero may provide the order of the software thread dispatches. For example, the order of dispatches of the second kernel 904 may be determined based on the first offset value and the second offset value with respect to the offset zero.

Figure 10:
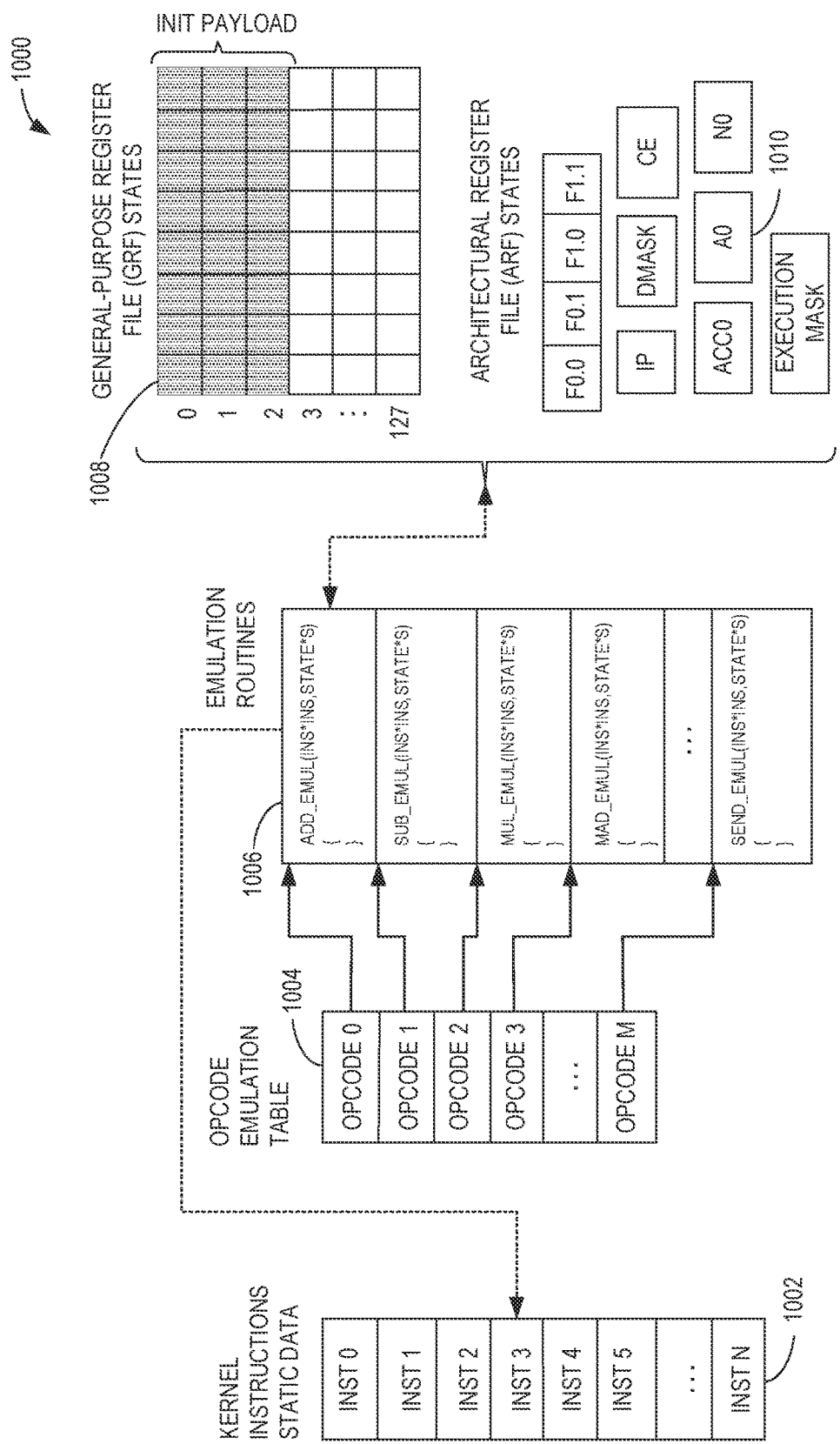
FIG. 10 is an illustration of an example workflow to emulate execution of the example instrumented kernel of FIG. 9.

FIG. 10 is an illustration of an example workflow 1000 to emulate execution of an instrumented GPU kernel, such as the second kernel 108 of FIG. 1, the kernel 706 of FIG. 7, and/or the second kernel 904 of FIG. 9. For example, the workflow 1000 may be implemented by the GLIT engine 102 of FIGS. 1 and/or 4. In this example, the workflow 1000 is implemented by example kernel instructions static data 1002, an example opcode emulation table 1004, example emulation routines 1006, and example GPU states 1008, 1010. Alternatively, any other example workflow may be utilized to emulate execution of the instrumented GPU kernel.

In the illustrated example of FIG. 10, the kernel instructions static data 1002 may correspond to decoded instructions from a binary kernel. For example, the second kernel 108 may include a plurality of example encoded instructions in a binary format. In some examples, the trace extractor 420 of FIG. 4 may extract and/or otherwise decode the encoded instructions from the second kernel 108 to generate the kernel instructions static data 1002. In this example, the kernel instructions static data 1002 includes a first example instruction having a first instruction identifier (INST 0) as an index, which may correspond to a first decoded instruction from the second kernel 108 of FIG. 1. For example, INST 0 may correspond to the first SEND instruction of the second kernel 904 of FIG. 9 (e.g., SEND(16) R12 R6 0XC 0X4205E00).

In the illustrated example of FIG. 10, the opcode emulation table 1004 may correspond to opcodes supported by a particular GPU architecture, such as an architecture of the GPU 110 of FIG. 1. In this example, the opcode emulation table 1004 includes a first example opcode (OPCODE 0), which may correspond to a first type of instruction that the GPU 110 supports and/or otherwise is configured to execute upon invocation.

In the illustrated example of FIG. 10, the emulation routines 1006 may correspond to first instructions (e.g., machine readable instructions) that, when executed, can simulate execution of second instructions that the GPU 110 is configured to execute. In this example, the emulation routines 1006 include a first example emulation routine (ADD_EMUL), which may correspond to an emulation of an addition operation that the GPU 110 supports and/or otherwise is configured to execute upon invocation. In this example, opcode(s) in the opcode emulation table 1004 correspond to respective one(s) of the emulation routines 1006. For example, OPCODE 0 may correspond to ADD_EMUL, OPCODE 1 may correspond to SUB_EMUL, etc.

In the illustrated example of FIG. 10, the GPU states 1008, 1010 include example GRF states 1008 and example ARF states 1010. In this example, the GRF states 1008 are values of registers stored in a GRF implemented by a hardware thread of a GPU, such as one of the threads 208 of FIG. 2. In this example, the GRF states 1008 is implemented with 128 registers (r0-127). In this example, the ARF states 1010 are values of registers stored in an ARF implemented by the hardware thread of the GPU, such as the one of the threads 208 of FIG. 2.

In this example, the ARF states 1010 include a portion of the ARF. For example, the portion of the ARF includes a first register value to store a value of a first end of a first floating-point saturation range (F0.0), a second register value to store a value of a second end of the first floating-point saturation range (F0.1), a third register value to store a value of a first end of a second floating-point saturation range (F1.0), a fourth register value to store a value of a second end of the second floating-point saturation range (F1.1), a fifth register value to store a value of an instruction pointer (IP) register, a sixth register value to store a value of a DMASK register, a seventh register value to store a value of a CE register, an eighth register value to store a value of an accumulation register (ACC0), a ninth register value to store an address register (A0), a notification register (N0), and a tenth register value to store a value of an execution mask. By way of example, the IP register may implement a pointer that references the current instruction in memory of the GPU. In some examples, each of the threads 208 may have their own IP. Additionally or alternatively, the portion of the ARF may include fewer or more ARF states than depicted in the illustrated example of FIG. 10.

In example operation, the trace extractor 420 of FIG. 4 may decode a GLIT, such as the GLIT 600 of FIG. 6, to generate and/or otherwise output decoded binary data and GPU states. In some examples, the trace extractor 420 stores portion(s) of the decoded binary data as the kernel instructions static data 1002 utilizing instruction identifiers as an index. In some examples, the trace extractor 420 stores portion(s) of the decoded binary data as the GPU states 1008, 1010. In some examples, the trace extractor 420 associates one(s) of the kernel instructions static data 1002, opcode(s) in the opcode emulation table 1004, one(s) of the emulation routines 1006, and/or one(s) of the GPU states 1008, 1010. For example, the trace extractor 420 can determine that INST 0 corresponds to OPCODE 0 and OPCODE 0 corresponds to ADD_EMUL. In such examples, the trace extractor 420 can store an association of at least one of INST 0, OPCODE 0, ADD_EMUL, or corresponding one(s) of the GPU states 1008, 1010. For example, the trace extractor 420 can store the association in the storage 460 of FIG. 4.

In example operation, the trace emulator 430 of FIG. 4 can emulate execution of a GPU kernel from which the kernel instructions static data 1002 and/or the GPU states 1008, 1010 are generated. In some examples, the trace emulator 430 can replay a GLIT, such as the GLIT 600, by selecting INST 0 to execute. In some examples, in response to selecting INST 0 to execute, the trace emulator 430 calls the first emulation routine of ADD_EMUL and enters at least one of INST 0, OPCODE 0, or the corresponding one(s) of the GPU states 1008, 1010 as arguments into the first emulation routine. Advantageously, the trace emulator 430 may replay the execution of a GPU kernel, such as the second kernel 108 of FIG. 1, by executing (e.g., iteratively executing) one(s) of the emulation routines in the emulation routine table 1006 that correspond to instructions of the GPU kernel, which may be represented by the information included in the kernel instructions static data 1002.

Source code and/or flowcharts representative of example hardware logic, machine readable instructions, hardware implemented state machines, and/or any combination thereof for implementing the example GLIT engine 102 of FIGS. 1 and/or 4 are shown in FIGS. 11-17. The machine readable instructions may be one or more executable programs or portion(s) of an executable program for execution by a computer processor and/or processor circuitry, such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the source code and/or flowcharts illustrated in FIGS. 11-17, many other methods of implementing the example GLIT engine 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a DLL), a software development kit (SDK), an API, etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-17 may be implemented using executable instructions (e.g., computer and/or machine readable instructions) stored on a non-transitory computer and/or machine readable medium such as a HDD, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 11:
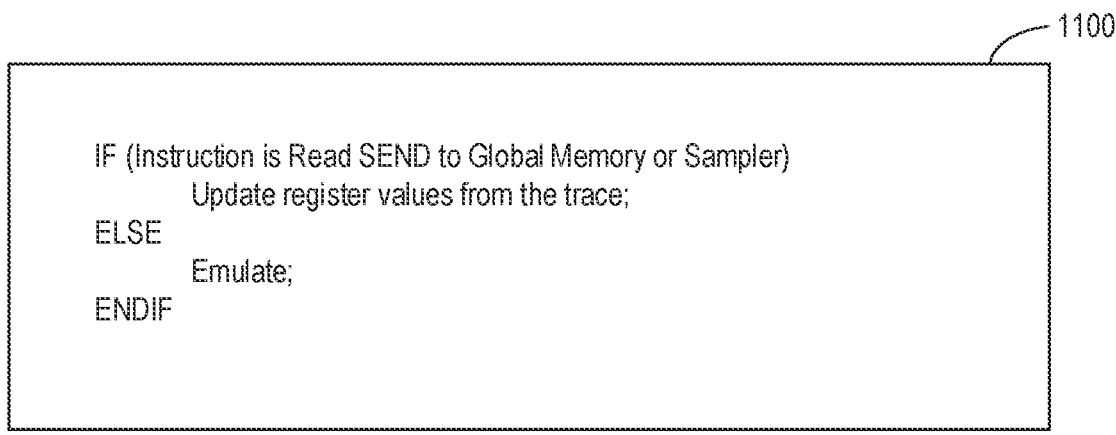
FIG. 11 depicts example source code to emulate execution of the example instrumented kernel of FIG. 9.

FIG. 11 depicts example source code 1100 to emulate execution of an example instrumented kernel, such as the second kernel 108 of FIG. 1, the kernel 706 of FIG. 7, and/or the second kernel 904 of FIG. 9. Alternatively, any other source code may be executed to emulate the execution of the instrumented kernel. In some examples, the source code 1100 of FIG. 11 may be representative of machine readable instructions that may be executed by the trace emulator 430 of FIG. 4 and/or, more generally, the GLIT engine 102 of FIGS. 1 and/or 4. For example, the trace emulator 430 may execute the source code 1100 to emulate (e.g., iteratively emulate) instructions included in the instrumented kernel that is executed by a GPU, such as the GPU 110 of FIG. 1.

In some examples, in response to executing the source code 1100, the trace emulator 430 can select one of the instructions included in the kernel instructions static data 1002 of FIG. 10. For example, the trace emulator 430 can select an instruction that corresponds to INST 0. In some examples, in response to executing the source code 1100, the trace emulator 430 can determine whether the instruction that corresponds to INST 0 is a SEND instruction to global memory (e.g., the cache memory 210) or a sampler (e.g., the sampler 216 of FIG. 2). If the trace emulator 430 determines that the instruction is a SEND instruction to the global memory or the sampler, the trace emulator 430 can update register values from the trace. For example, the trace emulator 430 can update register values based on the GPU states 1008, 1010 prior to and/or after executing the instruction.

In some examples, if the trace emulator 430 determines that the instruction is not a SEND instruction to the global memory or the sampler, then the trace emulator 430 may emulate the instruction. For example, the trace emulator 430 may emulate the instruction by invoking one of the emulation routines of the emulation routine table 1006 to emulate the instruction. In this example, the trace emulator 430 may execute (e.g., iteratively execute) the source code 1100 for one or more of the instructions included in the kernel instructions static data 1002 of FIG. 10.

Figure 12:
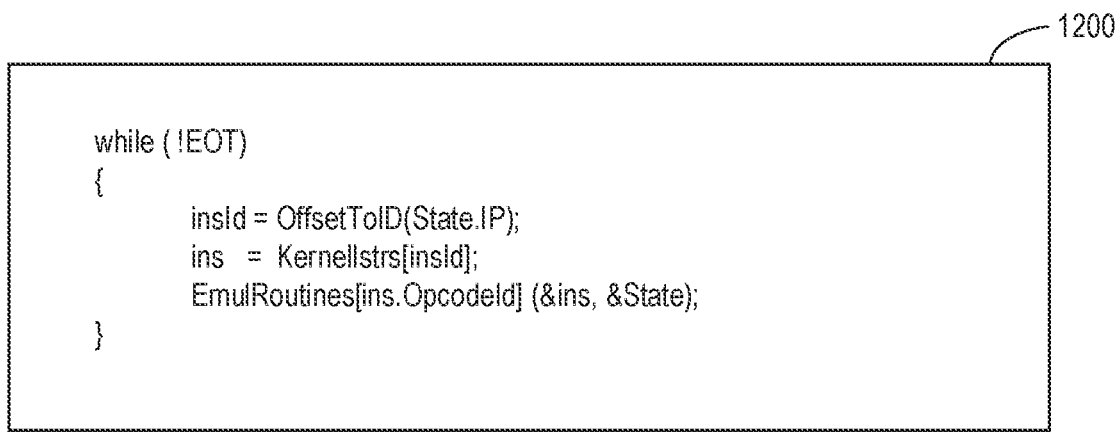
FIG. 12 depicts example source code to emulate execution of an example software thread.

FIG. 12 depicts example source code 1200 to emulate execution of an example software thread. Alternatively, any other source code may be executed to emulate the execution of the software thread. In some examples, the source code 1200 of FIG. 12 may be representative of machine readable instructions that may be executed by the trace emulator 430 of FIG. 4 and/or, more generally, the GLIT engine 102 of FIGS. 1 and/or 4. For example, the trace emulator 430 may execute the source code 1200 to emulate an instance of dispatching a kernel, such as the second kernel 108, to a hardware thread, such as one of the threads 208, by emulating instruction(s) included in the kernel.

In some examples, in response to executing the source code 1200, the trace emulator 430 emulates the instruction(s) included in the kernel by determining an offset identifier (e.g., an offset value) (OffsetToID) corresponding to one of the instruction(s). For example, the trace emulator 430 may determine the offset identifier based on the GPU state of the IP register value (State.IP) of the ARF. In some examples, in response to executing the source code 1200, the trace emulator 430 returns an instruction (ins), such as INST 0 of FIG. 10, based on the instruction identifier. In some examples, in response to executing the source code 1200, the trace emulator 430 identifies an opcode based on the instruction. In some examples, in response to executing the source code 1200, the trace emulator 430 identifies one of the emulation routines of the emulation routine table 1006 based on the opcode. In some examples, in response to executing the source code 1200, the trace emulator 430 executes the identified one of the emulation routines utilizing the instruction and one or more GPU states (State) as example arguments. In this example, the trace emulator 430 may execute (e.g., iteratively execute) the source code 1200 until an end-of-time (EOT) instruction is generated, which may be generated in response to the last instruction of the kernel being executed. For example, the EOT instruction may generated in response to INST N of FIG. 10 being emulated.

Figure 13:
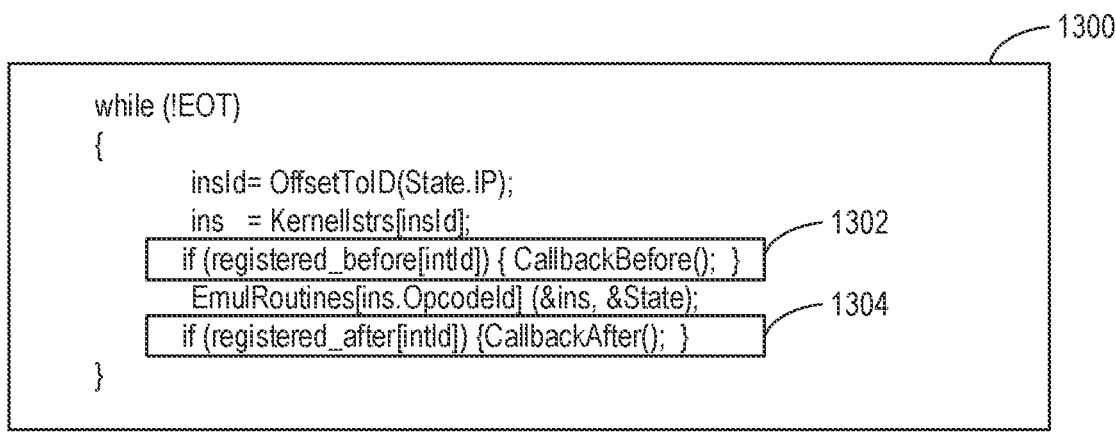
FIG. 13 depicts example source code to emulate execution of an example instrumented software thread.

FIG. 13 depicts example source code 1300 to emulate execution of an example instrumented software thread. Alternatively, any other source code may be executed to emulate the execution of the instrumented software thread. In some examples, the source code 1300 of FIG. 13 may be representative of machine readable instructions that may be executed by the trace emulator 430 of FIG. 4 and/or, more generally, the GLIT engine 102 of FIGS. 1 and/or 4. For example, the trace emulator 430 may execute the source code 1300 to emulate an instance of dispatching a kernel, such as the second kernel 108, to a hardware thread, such as one of the threads 208, by emulating instruction(s) included in the kernel.

In some examples, the source code 1300 may be implemented by instrumenting the source code 1200 of FIG. 12 with a first example instrumentation routine (e.g., an instrumented routine, an instrumentation instruction, etc.) 1302 and a second example instrumentation routine 1304. For example, the trace emulator 430 can execute the first instrumentation routine 1302 prior to executing the emulation routine (EmulRoutines) and the second instrumentation routine 1304 after executing the emulation routine.

In some examples, in response to executing the first instrumentation routine 1302, the trace emulator 430 can invoke a callback routine (e.g., "CallbackBefore( );") to invoke an API to provide GPU states of a hardware thread that executed the software thread to an upper level construct, such as the application 120 of FIG. 1, the hardware profiling analysis tool 718 of FIG. 7, etc.

In some examples, in response to executing the second instrumentation routine 1304, the trace emulator 430 can invoke a callback routine (e.g., "CallbackAfter( );") to invoke an API to provide GPU states of the hardware thread that executed the software thread to an upper level construct, such as the application 120 of FIG. 1, the hardware profiling analysis tool 718 of FIG. 7, etc. Advantageously, by registering the callback routines with the upper level construct, the trace emulator 430 can provide GPU states of the hardware thread prior to and/or after executing the emulation routine to determine changes in the GPU states in response to executing the emulation routine.

Figure 14:
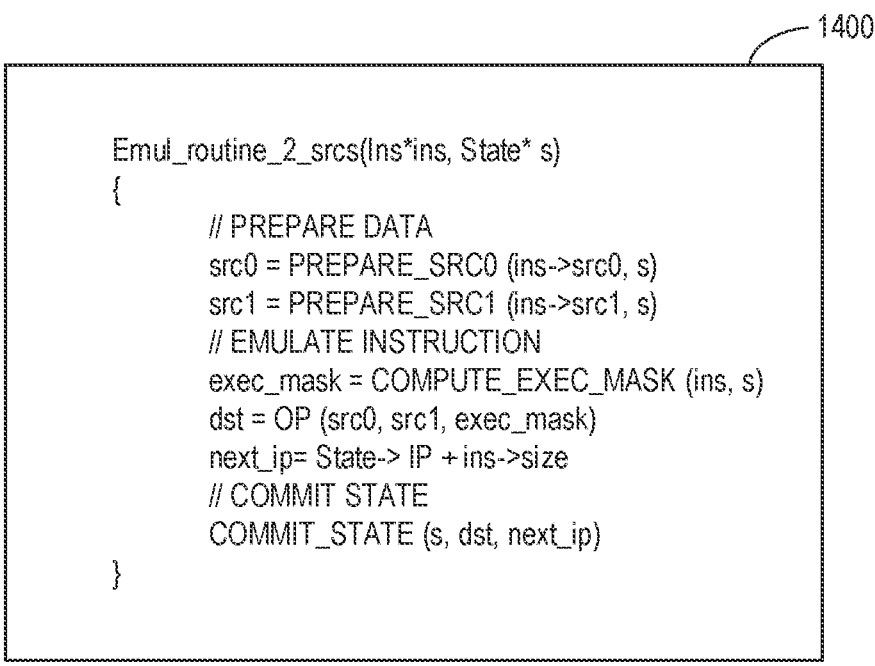
FIG. 14 depicts example source code to implement an emulation routine.

FIG. 14 depicts example source code 1400 to implement an emulation routine. Alternatively, any other source code may be executed to implement the emulation routine. In some examples, the source code 1400 may implement one(s) of the emulation routines in the emulation routines table 1006 of FIG. 10 and/or the emulation routine (EmulRoutines) of FIG. 13. In some examples, the source code 1400 of FIG. 14 may be representative of machine readable instructions that may be executed by the trace emulator 430 of FIG. 4 and/or, more generally, the GLIT engine 102 of FIGS. 1 and/or 4, to simulate execution of GPU kernel instructions, such as instructions included in the second kernel 108 of FIG. 1.

In some examples, in response to executing the source code 1400, the trace emulator 430 may prepare the data for the emulation of the instruction by determining a first source operand (src0) and a second source operand (src1). For example, the trace emulator 430 may determine the first source operand based on a first GPU state, such as a GRF state associated with a hardware thread that executed the GPU kernel instructions. In some examples, in response to executing the source code 1400, the trace emulator 430 may determine the second source operand based on a second GPU state, such as an ARF state associated with the hardware thread that executed the GPU kernel instructions.

In some examples, in response to executing the source code 1400, the trace emulator 430 may emulate the instruction by determining an execution mask (exec_mask), a destination register (dst), and a next IP register (next_ip). In some examples, in response to executing the source code 1400, the trace emulator 430 may commit the new GPU state based on the GPU state, the destination register, and the next IP register to process. For example, the trace emulator 430 may store the new GPU state for subsequent processing and/or analysis.

Figure 15:
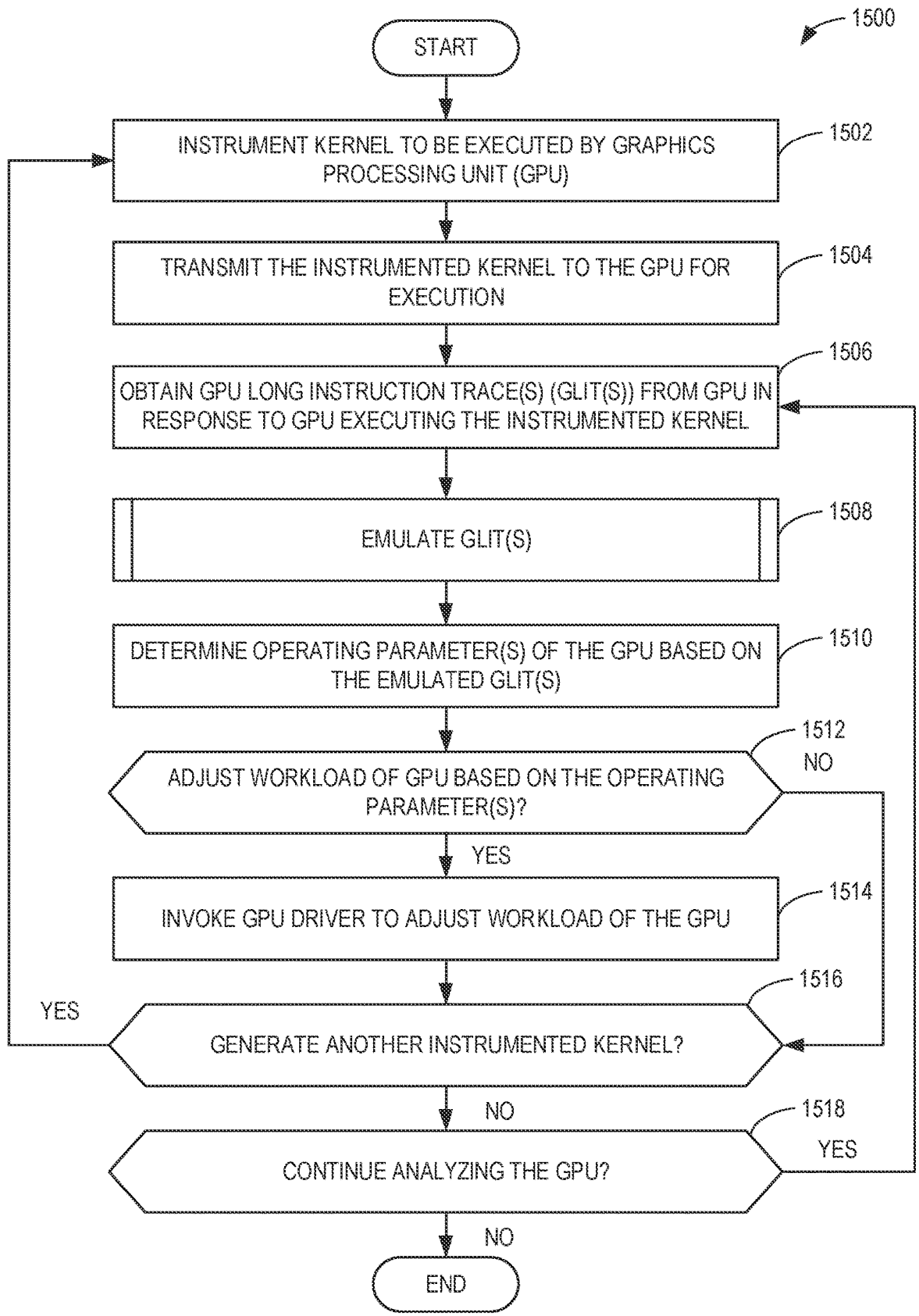
FIG. 15 is a flowchart representative of machine readable instructions that may be executed to implement the GLIT engine of FIGS. 1 and/or 4 to improve operation of the example GPU of FIG. 1 and/or the example GPU portion of FIG. 2.

FIG. 15 is a flowchart representative of machine readable instructions 1500 that may be executed to implement the GLIT engine 102 of FIGS. 1 and/or 4 to improve operation of a GPU. The machine readable instructions 1500 of FIG. 15 begin at block 1502, at which the GLIT engine 102 instruments a kernel to be executed by a graphics processing unit (GPU). For example, the instruction generator 410 (FIG. 4) may instrument the first kernel 106 of FIG. 1 by inserting the profiling instructions 104A-104C to generate the second kernel 108 of FIG. 1.

At block 1504, the GLIT engine 102 transmits the instrumented kernel to the GPU for execution. For example, the instruction generator 410 can provide the second kernel 108 for storage in the memory 116 of FIG. 1. In some examples, the GPU 110 of FIG. 1 can retrieve the second kernel 108 from the instruction generator 410, the GPU driver 122 of FIG. 1, and/or the memory 116.

At block 1506, the GLIT engine 102 obtains GPU long instruction trace(s) (GLIT(s)) from the GPU in response to the GPU executing the instrumented kernel. For example, in response to obtaining the second kernel 108, the GPU 110 can execute the second kernel 108. In some examples, in response to executing the second kernel 108, the GPU 110 can generate the GLIT(s) 112 of FIG. 1, the GLIT 600 of FIG. 6, etc. For example, the GPU 110 can generate the GLIT(s) 112, the GLIT 600 of FIG. 6, etc., to be encoded in a binary format, such as the GLIT format 300 of FIG. 3.

At block 1508, the GLIT engine 102 emulates the GLIT(s). For example, the trace extractor 420 (FIG. 4) can decode the encoded binary kernel that may implement the GLIT(s) 112, the GLIT 600 of FIG. 6, etc. In some examples, the trace emulator 430 (FIG. 4) can instrument emulation routines to provide GPU states before and/or after executing the instrumented emulation routines to the application 120 of FIG. 1 via one or more APIs. An example process that may be executed to implement block 1508 is described below in connection with FIG. 16.

At block 1510, the GLIT engine 102 determines operating parameter(s) of the GPU based on the emulated GLIT(s). For example, the trace analyzer 440 (FIG. 4) may determine the GPU states, an execution time parameter, a busy time parameter, an idle time parameter, an occupancy time parameter, or a utilization parameter based on the emulation of the GLIT(s) 112, the GLIT 600, etc.

At block 1512, the GLIT engine 102 determines whether to adjust a workload of a GPU based on the operating parameter(s). For example, the hardware configurator 450 (FIG. 4) can determine to increase a number of instructions to be executed by the GPU 110 in response to determining that the utilization of one(s) of the thread(s) 208 of FIG. 2, and/or, more generally, the GPU slice 200 of FIG. 2, is less than a utilization threshold. In some examples, the hardware configurator 450 can determine that one or more of the threads 208 are not utilized based on their corresponding GPU states not changing values in response to the distribution of the second kernel 108 to the GPU 110. In some examples, in response to determining that the one(s) of the thread(s) 208 are not utilized and/or underutilized based on the utilization threshold not being satisfied, the hardware configurator 450 may increase the number of instructions to be executed by the one(s) of the thread(s) 208.

If, at block 1512, the GLIT engine 102 determines to not adjust the workload of the GPU based on the operating parameter(s), control proceeds to block 1516 to determine whether to generate another instrumented kernel. If, at block 1512, the GLIT engine 102 determines to adjust the workload of the GPU based on the operating parameter(s), then, at block 1514, the GLIT engine 102 invokes a GPU driver to adjust a workload of the GPU. For example, the hardware configurator 450 can instruct the GPU driver 122 to increase a number of instructions to be executed by the GPU 110, decrease a number of instructions to be executed by the GPU 110, adjust a scheduling of the second kernel 108 across one(s) of the thread(s) 208 of one(s) of the execution units 204 of FIG. 2, etc., and/or a combination thereof.

In response to invoking the GPU driver to adjust the workload of the GPU at block 1514, at block 1516, the GLIT engine 102 determines whether to generate another instrumented kernel. For example, the instruction generator 410 can determine to instrument a different kernel than the first kernel 106 of FIG. 1. In some examples, the instruction generator 410 determines to re-instrument the first kernel 106 by adding, subtracting, and/or modifying one(s) of the profiling instructions 104A-104C, adding, subtracting, and/or modifying one(s) of the kernel instructions (e.g., INSTR1, INSTR2, etc., of FIG. 1), etc., and/or a combination thereof.

At block 1518, the GLIT engine 102 determines whether to continue analyzing the GPU. For example, the trace emulator 430 can determine to continue analyzing the GPU 110 to determine operating parameter(s) associated with the GPU 110. In some examples, the trace emulator 430 can determine to continue analyzing by restarting and/or otherwise re-emulating the GLIT(s) 112 of FIG. 1, the GLIT 600 of FIG. 6, etc. If, at block 1518, the GLIT engine 102 determines to continue analyzing the GPU, control returns to block 1506 to obtain another GLIT from the GPU in response to the GPU executing the instrumented kernel, otherwise the example machine readable instructions 1500 of FIG. 15 conclude.

Figure 16:
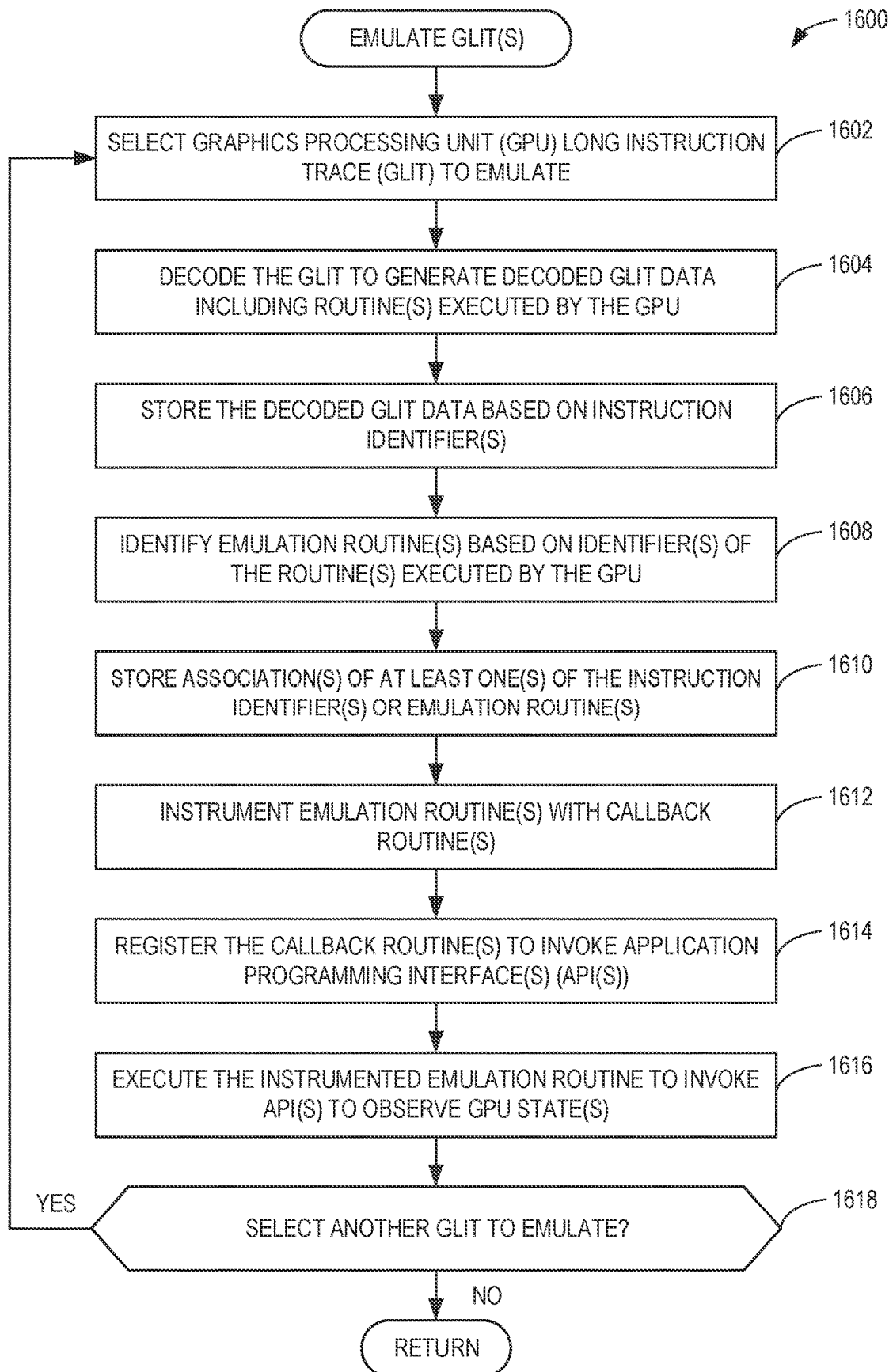
FIG. 16 is a flowchart representative of machine readable instructions that may be executed to implement the GLIT engine of FIGS. 1 and/or 4 to emulate one or more example GLITs.

FIG. 16 is a flowchart representative of machine readable instructions 1600 that may be executed to implement the GLIT engine 102 of FIGS. 1 and/or 4 to emulate one or more example GLITs. In some examples, the machine readable instructions 1600 may implement block 1508 of FIG. 15. The machine readable instructions 1600 of FIG. 16 begin at block 1602, at which the GLIT engine 102 selects a graphics processing unit (GPU) long instruction trace (GLIT) to emulate. For example, the trace extractor 420 (FIG. 4) can select a first one of the GLIT(s) 112 of FIG. 1, a first one of the GLIT(s) 470 of FIG. 4, etc., to emulate. In some examples, the first one of the GLIT(s) 112 may include one or more binary kernels including a first binary kernel. In some examples, the first binary kernel may correspond to, and/or otherwise include data associated with, the GLIT 600 of FIG. 6. In such examples, the first binary kernel may have a binary format, such as the GLIT format 300 of FIG. 3.

At block 1604, the GLIT engine 102 decodes the GLIT to generate decoded GLIT data including routine(s) executed by the GPU. For example, the trace extractor 420 can decode the first binary kernel to generate and/or otherwise output the records 126 of FIG. 1, the records 302 of FIG. 3, etc. In some examples, the trace extractor 420 can identify the kernel instructions static data 1002 of FIG. 10 based on the records 126 of FIG. 1, the records 302 of FIG. 3, etc. For example, the trace extractor 420 can identify routine(s) executed by the GPU 110, such as an addition instruction, a multiplication instruction, a SEND instruction, a READ SEND instruction, etc., and/or a combination thereof.

At block 1606, the GLIT engine 102 stores the decoded GLIT data based on instruction identifier(s). For example, the trace extractor 420 can store the kernel instructions static data 1002 utilizing instruction identifier(s) decoded from the first binary kernel as an index. In some examples, the trace extractor 420 can store the decoded GLIT data in the storage 460 (FIG. 4).

At block 1608, the GLIT engine 102 identifies emulation routine(s) based on identifier(s) of the routine(s) executed by the GPU. For example, the trace extractor 420 can identify a first routine of the emulation routines in the emulation routine table 1006 based on an opcode that corresponds to a first one of the routine(s) of the kernel instructions static data 1002.

At block 1610, the GLIT engine 102 stores association(s) of at least one(s) of the instruction identifier(s) or emulation routine(s). For example, the trace extractor 420 can associate one(s) of the instruction identifier(s) (e.g., INST 0, INST1, INST2, etc., of FIG. 10) of the kernel instructions static data 1002 of FIG. 10, one(s) of the opcodes (e.g., OPCODE 0, OPCODE 1, OPCODE 2, etc., of FIG. 10) of the opcode emulation table 1004 of FIG. 10, or one(s) of the emulation routines (e.g., ADD_EMUL, SUB_EMUL, MUL_EMUL, etc.) of the emulation routines table 1006 of FIG. 10. In some examples, the trace extractor 420 can store the associations in the storage 460.

At block 1612, the GLIT engine 102 instruments emulation routine(s) with callback routine(s). For example, the trace emulator 430 (FIG. 4) can instrument one(s) of the emulation routines included in the emulation routines table 1006 of FIG. 10 by inserting example instrumentation instructions, such as the first instrumentation routine 1302 of FIG. 13 and/or the second instrumentation routine 1304 of FIG. 13, into the source code 1300 of FIG. 13.

At block 1614, the GLIT engine 102 registers the callback routine(s) to invoke application programming interface(s) (API(s)). For example, the trace emulator 430 can register the instrumented one(s) of the emulation routines of the emulation routines table 1006 with the application 120 of FIG. 1, an OS operating on the CPU 118 of FIG. 1, etc., and/or a combination thereof.

At block 1616, the GLIT engine 102 executes the instrumented emulation routine to invoke API(s) to observe GPU state(s). For example, in response to executing the registered callback routines included in the instrumented emulation routines, the trace emulator 430 can execute registered callback routines to invoke one or more APIs to observe GPU states. In some examples, the GPU states may correspond to the GPU states 1008, 1010 of FIG. 10. For example, in response to invoking the one or more APIs, the trace emulator 430 can observe a first value of a GPU state of one of the threads 208 prior to executing the second kernel 108 and/or a second value of the GPU state of the one of the threads 208 after executing the second kernel 108.

At block 1618, the GLIT engine 102 determines whether to select another GLIT to emulate. For example, the trace emulator 430 and/or the trace analyzer 440 can determine to select another one of the GLIT(s) 112 to simulate. If, at block 1618, the GLIT engine 102 determines to select another GLIT to process, control returns to block 1602 to select another GLIT to emulate. If, at block 1618, the GLIT engine 102 determines not to select another GLIT to emulate, control may return to block 1510 of the example machine readable instructions 1500 of FIG. 15 to determine operating parameter(s) of the GPU based on the emulated GLIT(s). Additionally or alternatively, the example machine readable instructions 1600 of FIG. 16 may conclude.

Figure 17:
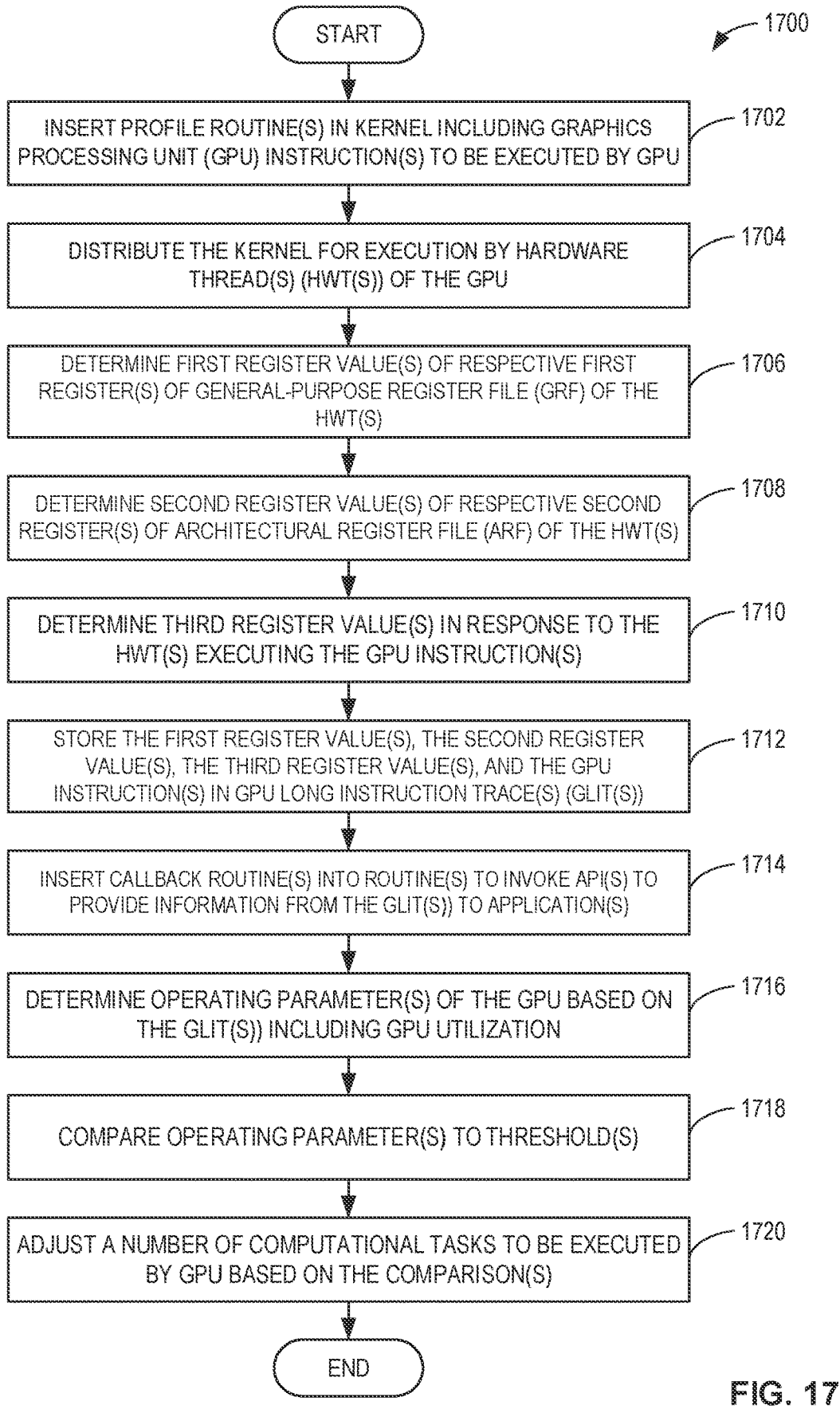
FIG. 17 is another flowchart representative of machine readable instructions that may be executed to implement the GLIT engine of FIGS. 1 and/or 4 to improve operation of the example GPU of FIG. 1 and/or the example GPU portion of FIG. 2.

FIG. 17 is a flowchart representative of machine readable instructions 1700 that may be executed to implement the GLIT engine 102 of FIGS. 1 and/or 4 to improve operation of a GPU. The machine readable instructions 1700 of FIG. 17 begin at block 1702, at which the GLIT engine 102, and/or, more generally, the CPU 118 of FIG. 1, inserts profile routine(s) in a kernel including graphics processing unit (GPU) instruction(s) to be executed by a GPU. For example, the instruction generator 410 (FIG. 4) may insert the profiling instructions 104A-104C into the first kernel 106 to generate the second kernel 108 of FIG. 1, which may be executed by the GPU 110 of FIG. 1. In some examples, the first kernel 106 and the second kernel 108 include GPU instructions, such as an addition instruction, a multiplication instruction, a SEND instruction, a READ SEND instruction, etc., and/or a combination thereof.

At block 1704, the GPU 110 distributes the kernel for execution by hardware thread(s) (HWT(s)) of the GPU. For example, the instruction generator 410 can provide the second kernel 108 for storage in the memory 116 of FIG. 1. In some examples, the GPU 110 of FIG. 1 can retrieve the second kernel 108 from the instruction generator 410, the GPU driver 122 of FIG. 1, and/or the memory 116. For example, the local thread dispatcher 220 of FIG. 2 may obtain the second kernel 108 and distribute the second kernel to one(s) of the thread(s) 208 for execution.

At block 1706, the GPU 110 determines first register value(s) of respective first register(s) of a General-Purpose Register File (GRF) of the HWT(s). For example, a first thread of the thread(s) 208 may determine one or more first register values of one or more first registers of a first GRF implemented by the first thread. In some examples, a second thread of the thread(s) 208 may determine one or more second register values of one or second more registers of a second GRF implemented by the second thread.

At block 1708, the GPU 110 determines second register value(s) of respective second register(s) of an Architectural Register File (ARF) of the HWT(s). For example, the first thread of the thread(s) 208 may determine one or more third register values of one or more first registers of a first ARF implemented by the first thread. In some examples, the second thread of the thread(s) 208 may determine one or more second fourth values of one or second more registers of a second ARF implemented by the second thread.

At block 1710, the GPU 110 determines third register value(s) in response to the HWT(s) executing the GPU instruction(s). For example, the first thread of the thread(s) 208 may determine one or more fifth register values of one or more respective first destination registers in response to the first thread executing a SEND instruction to the sampler 216 of FIG. 2, the cache memory 210 of FIG. 2, etc. In some examples, the second thread of the thread(s) 208 may determine one or more sixth register values of one or more respective second destination registers in response to the second thread executing a SEND instruction to the sampler 216 of FIG. 2, the cache memory 210 of FIG. 2, etc.

At block 1712, the GPU 110 stores the first register value(s), the second register value(s), the third register value(s), and the GPU instruction(s) in GPU long instruction trace(s) (GLIT(s)). For example, the first thread of the thread(s) 208 may store at least one of the one or more first register values, the one or more third register values, the one or more fifth register values, or the one or more GPU instructions in an encoded binary file that may implement a GLIT, such as one of the GLIT(s) 112 of FIG. 1, one of the GLIT(s) 470 of FIG. 4, the GLIT 600 of FIG. 6, etc. In some examples, the second thread of the thread(s) 208 may store at least one of the one or more second register values, the one or more fourth register values, the one or more sixth register values, or the one or more GPU instructions in the encoded binary file.

At block 1714, the GLIT engine 102, and/or, more generally, the CPU 118, inserts callback routine(s) into routine(s) to invoke API(s) to provide information from the GLIT(s) to application(s). For example, the trace emulator 430 (FIG. 4) can insert the first instrumentation routine 1302 and/or the second instrumentation routine 1304 of FIG. 13 into the source code 1300 of FIG. 13 to provide data from the GLIT(s) 112, such as a GPU state, to the application 120 of FIG. 1 via one or more APIs.

At block 1716, the GLIT engine 102, and/or, more generally, the CPU 118, determines operating parameter(s) of the GPU based on the GLIT(s) including GPU utilization. For example, the trace analyzer 440 (FIG. 4) can determine one or more operating parameters of the GPU 110 including a utilization of the GPU 110 based on the data from the GLIT(s) 112.

At block 1718, the GLIT engine 102, and/or, more generally, the CPU 118, compares the operating parameter(s) to threshold(s). For example, the trace analyzer 440 can compare the utilization to a threshold, such as utilization threshold. In some examples, the trace analyzer 440 can compare a busy time, an occupancy, etc., of the GPU 110 to a busy time threshold, an occupancy threshold, etc.

At block 1720, the GLIT engine 102, and/or, more generally, the CPU 118, adjusts a number of computational tasks to be executed by a GPU based on the comparison(s). For example, the hardware configurator 450 (FIG. 4) can determine to increase a number of computational tasks to be executed by the GPU 110 or a different GPU based on the comparison of the utilization to the utilization threshold. In some examples, in response to determining that a utilization of 70% of the GPU 110 is below a utilization threshold of 90% of the GPU 110 and thereby does not satisfy the utilization threshold, the hardware configurator 450 can instruct and/or otherwise cause the GPU driver 110 of FIG. 1 to increase a number of computational tasks, kernels, etc., to be executed by the GPU 110. In response to adjusting the number of computational tasks to be executed by the GPU based on the comparison(s) at block 1720, the example machine readable instructions 1700 of FIG. 17 conclude.

Figure 18:
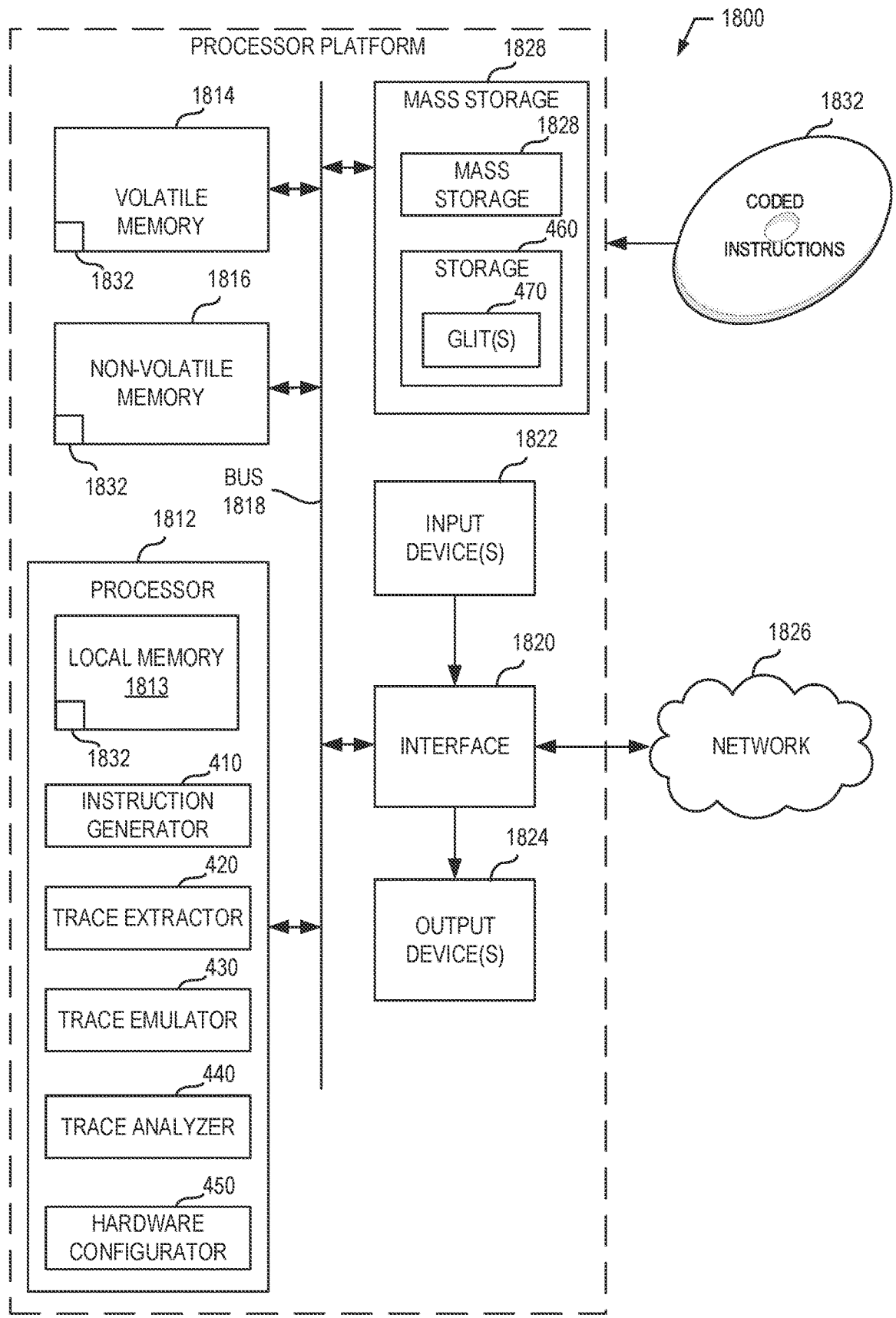
FIG. 18 is a block diagram of an example processing platform structured to execute the machine readable instructions of FIGS. 11-17 to implement the example GLIT engine of FIGS. 1 and/or 4.

FIG. 18 is a block diagram of an example processor platform 1800 structured to execute the instructions of FIGS. 11-17 to implement the GLIT engine 102 of FIGS. 1 and/or 4. The processor platform 1800 can be, for example, a server, a personal computer, a workstation, a self-learning machine (e.g., a neural network), or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1812 implements the example instruction generator 410, the example trace extractor 420, the example trace emulator 430, the example trace analyzer 440, and the example hardware configurator 450 of FIG. 4.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives. In this example, the one or more mass storage devices 1828 implement the storage 460 of FIG. 4, which stores the example GLIT(s) 470 of FIG. 4.

The machine executable instructions 1832 of FIGS. 11-17 may be stored in the mass storage device 1828, in the volatile memory 1814, in the non-volatile memory 1816, and/or on a removable non-transitory computer readable storage medium such as a CD or DVD.

Figure 19:
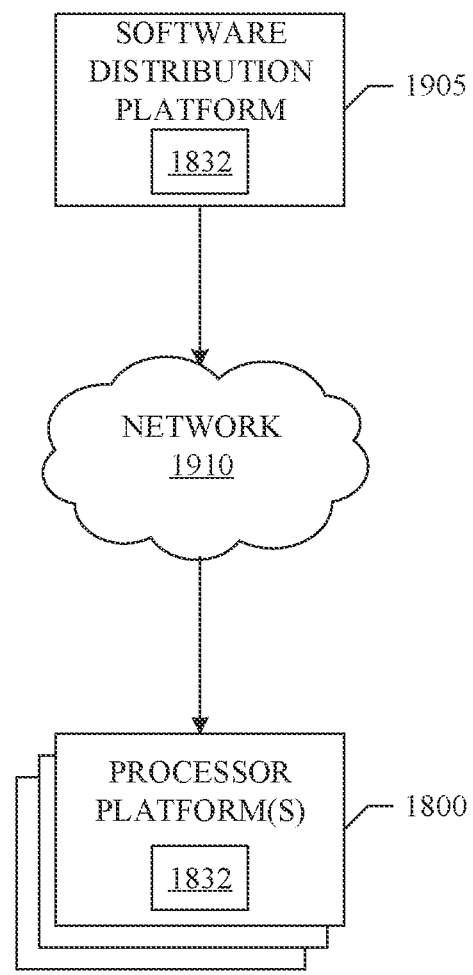
FIG. 19 is a block diagram of an example software distribution platform to distribute software (e.g., software corresponding to the example computer readable instructions of FIGS. 11-17) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1905 to distribute software such as the example computer readable instructions 1832 of FIG. 18 to third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1832 of FIG. 18. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the computer readable instructions 1832, which may correspond to the example computer readable instructions 1100, 1200, 1300, 1400, 1500, 1600, 1700 of FIGS. 11-17, as described above. The one or more servers of the example software distribution platform 1905 are in communication with a network 1910, which may correspond to any one or more of the Internet and/or any of the example networks 1826 described above. In some examples, the one or more servers are responsive to requests to transmit the software to a requesting party as part of a commercial transaction. Payment for the delivery, sale and/or license of the software may be handled by the one or more servers of the software distribution platform 1905 and/or via a third party payment entity. The servers enable purchasers and/or licensors to download the computer readable instructions 1832 from the software distribution platform 1905. For example, the software, which may correspond to the example computer readable instructions 1832 of FIG. 18, may be downloaded to the example processor platform 1800, which is to execute the computer readable instructions 1832 to implement the example GLIT engine 102 of FIGS. 1 and/or 4. In some example, one or more servers of the software distribution platform 1905 periodically offer, transmit, and/or force updates to the software (e.g., the example computer readable instructions 1832 of FIG. 18) to ensure improvements, patches, updates, etc., are distributed and applied to the software at the end user devices.

From the foregoing, it will be appreciated that example systems, methods, apparatus, and articles of manufacture have been disclosed that may be used to improve operation of a hardware processor, such as a GPU. The disclosed systems, methods, apparatus, and articles of manufacture define LITs for different hardware processors, such as the GPU, to facilitate the development of flexible analysis tools that may be developed in high-level languages such as C, C++, etc. Advantageously, such analysis tools may analyze operation of the hardware processor to generate profiling data at the granular level of a single hardware thread of the hardware processor. Advantageously, the disclosed systems, methods, apparatus, and articles of manufacture may generate multi-threaded traces because the same kernel may be distributed to multiple threads of the hardware processor.

The disclosed systems, methods, apparatus, and articles of manufacture may improve kernel debugging, developing models of memory, cache, samplers, etc., that may be utilized to improve operation of the GPU. For example, the disclosed systems, methods, apparatus, and articles of manufacture improve the efficiency of using a computing device by improving operation of the hardware processor of the computing device, such as by increasing a quantity of computational tasks to be executed by the hardware processor. The disclosed methods, apparatus and articles of manufacture are accordingly directed to one or more improvement(s) in the functioning of a computer.

Example methods, apparatus, systems, and articles of manufacture to generate graphics processing unit long instruction traces are disclosed herein. Further examples and combinations thereof include the following:

Example 1 includes an apparatus comprising at least one memory, and at least one processor to execute instructions to at least identify a first routine based on an identifier of a second routine executed by a graphics processing unit (GPU), the first routine based on an emulation of the second routine, execute the first routine to determine a first value of a GPU state of the GPU, the first routine having (i) a first argument associated with the second routine and (ii) a second argument corresponding to a second value of the GPU state prior to executing the first routine, and control a workload of the GPU based on the first value of the GPU state.

Example 2 includes the apparatus of example 1, wherein the GPU state is a state of a first register in an Architectural Register File associated with a hardware thread of the GPU or a second register of a General-Purpose Register File of the hardware thread.

Example 3 includes the apparatus of any one of examples 1-2, wherein the identifier is a first identifier extracted from an encoded binary file, and the at least one processor is to insert one or more profile routines in a kernel to be executed by a hardware thread of the GPU, and determine the first value, the second value, and a hardware thread identifier from a long instruction trace, the long instruction trace generated by the hardware thread in response to an execution of the one or more profile routines by the hardware thread, the first value corresponding to a GPU register value after an execution of the kernel by the hardware thread, the second value corresponding to the GPU register value prior to the execution of the kernel by the hardware thread, the hardware thread identifier to identify the hardware thread.

Example 4 includes the apparatus of any one of examples 1-3, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

Example 5 includes the apparatus of any one of examples 1-4, wherein the kernel includes a device access instruction to be executed by the hardware thread, and the at least one processor is to determine one or more first register values of one or more respective first registers of a General-Purpose Register File of the GPU, determine one or more second register values of one or more respective second registers of an Architectural Register File of the GPU, and store the one or more first register values, the one or more second register values, one or more third register values, and the device access instruction in the long instruction trace, the one or more third register values corresponding to one or more respective destination registers associated with the device access instruction.

Example 6 includes the apparatus of any one of examples 1-5, wherein the at least one processor is to determine a utilization of the GPU based on the first GPU state, compare the utilization to a threshold, and in response to determining that the threshold has not been satisfied based on the comparison, cause at least one of an adjustment to the second routine or an increased number of computational tasks to be executed by the GPU to control the workload of the GPU.

Example 7 includes the apparatus of any one of examples 1-6, wherein the first routine is an instrumented routine including an emulation routine, and the at least one processor is to insert a first callback routine in the instrumented routine before the emulation routine, the first callback routine to invoke a first application programming interface (API) to provide the second GPU state to an application, and insert a second callback routine in the instrumented routine after the emulation routine, the second callback routine to invoke the first API or a second API to provide the first GPU state to the application.

Example 8 includes at least one storage device comprising instructions that, when executed, cause at least one processor to at least identify a first routine based on an identifier of a second routine executed by a graphics processing unit (GPU), the first routine based on an emulation of the second routine, execute the first routine to determine a first value of a GPU state of the GPU, the first routine having (i) a first argument associated with the second routine and (ii) a second argument corresponding to a second value of the GPU state prior to executing the first routine, and control a workload of the GPU based on the first value of the GPU state.

Example 9 includes the at least one storage device of example 8, wherein the GPU state is a state of a first register in an Architectural Register File associated with a hardware thread of the GPU or a second register of a General-Purpose Register File of the hardware thread.

Example 10 includes the at least one storage device of any of examples 8-9, wherein the identifier is a first identifier extracted from an encoded binary file, and the instructions, when executed, cause the at least one processor to insert one or more profile routines in a kernel to be executed by a hardware thread of the GPU, and determine the first value, the second value, and a hardware thread identifier from a long instruction trace, the long instruction trace generated by the hardware thread in response to an execution of the one or more profile routines by the hardware thread, the first value corresponding to a GPU register value after an execution of the kernel by the hardware thread, the second value corresponding to the GPU register value prior to the execution of the kernel by the hardware thread, the hardware thread identifier to identify the hardware thread.

Example 11 includes the at least one storage device of any of examples 8-10, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

Example 12 includes the at least one storage device of any of examples 8-11, wherein the kernel includes a device access instruction to be executed by the hardware thread, and the instructions, when executed, cause the at least one processor to determine one or more first register values of one or more respective first registers of a General-Purpose Register File of the GPU, determine one or more second register values of one or more respective second registers of an Architectural Register File of the GPU, and store the one or more first register values, the one or more second register values, one or more third register values, and the device access instruction in the long instruction trace, the one or more third register values corresponding to one or more respective destination registers associated with the device access instruction.

Example 13 includes the at least one storage device of any of examples 8-12, wherein the instructions, when executed, cause the at least one processor to determine a utilization of the GPU based on the first GPU state, compare the utilization to a threshold, and in response to determining that the threshold has not been satisfied based on the comparison, cause at least one of an adjustment to the second routine or an increased number of computational tasks to be executed by the GPU to control the workload of the GPU.

Example 14 includes the at least one storage device of any of examples 8-13, wherein the first routine is an instrumented routine including an emulation routine, and the instructions, when executed, cause the at least one processor to insert a first callback routine in the instrumented routine before the emulation routine, the first callback routine to invoke a first application programming interface (API) to provide the second GPU state to an application, and insert a second callback routine in the instrumented routine after the emulation routine, the second callback routine to invoke the first API or a second API to provide the first GPU state to the application.

Example 15 includes an apparatus comprising means for identifying a first routine based on an identifier of a second routine executed by a graphics processing unit (GPU), the first routine based on an emulation of the second routine, means for executing the first routine to determine a first value of a GPU state of the GPU, the first routine having (i) a first argument associated with the second routine and (ii) a second argument corresponding to a second value of the GPU state prior to executing the first routine, and means for controlling a workload of the GPU based on the first value of the GPU state.

Example 16 includes the apparatus of example 15, wherein the GPU state is a state of a first register in an Architectural Register File associated with a hardware thread of the GPU or a second register of a General-Purpose Register File of the hardware thread.

Example 17 includes the apparatus of any of examples 15-16, wherein the identifier is a first identifier extracted from an encoded binary file, and further including means for inserting one or more profile routines in a kernel to be executed by a hardware thread of the GPU, and the means for executing to determine the first value, the second value, and a hardware thread identifier from a long instruction trace generated by the hardware thread in response to an execution of the one or more profile routines by the hardware thread, the first value corresponding to a GPU register value after an execution of the kernel by the hardware thread, the second value corresponding to the GPU register value prior to the execution of the kernel by the hardware thread, the hardware thread identifier to identify the hardware thread.

Example 18 includes the apparatus of any of examples 15-17, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

Example 19 includes the apparatus of any of examples 15-18, wherein the kernel includes a device access instruction to be executed by the hardware thread, and the means for executing is to determine one or more first register values of one or more respective first registers of a General-Purpose Register File of the GPU, determine one or more second register values of one or more respective second registers of an Architectural Register File of the GPU, and store the one or more first register values, the one or more second register values, one or more third register values, and the device access instruction in the long instruction trace, the one or more third register values corresponding to one or more respective destination registers associated with the device access instruction.

Example 20 includes the apparatus of any of examples 15-19, further including means for determining a utilization of the GPU based on the first GPU state, and the means for controlling is to, in response to determining that the utilization does not satisfy a threshold, cause at least one of an adjustment to the second routine or an increased number of computational tasks to be executed by the GPU to control the workload of the GPU.

Example 21 includes the apparatus of any of examples 15-20, wherein the first routine is an instrumented routine including an emulation routine, and the means for executing is to insert a first callback routine in the instrumented routine before the emulation routine, the first callback routine to invoke a first application programming interface (API) to provide the second GPU state to an application, and insert a second callback routine in the instrumented routine after the emulation routine, the second callback routine to invoke the first API or a second API to provide the first GPU state to the application.

Example 22 includes a system comprising a graphics processing unit (GPU) having a hardware thread, the hardware thread to determine a first value of a GPU state, execute a GPU routine included in a kernel to determine a second value of the GPU state, and generate a long instruction trace including the GPU routine, the first value, and the second value, and a central processing unit (CPU) to insert one or more profile routines in the kernel, identify a first routine based on an identifier of the GPU routine, the first routine based on an emulation of the GPU routine, execute the first routine to replay execution of the GPU routine to determine the second value of the GPU state, the first routine to have (i) a first argument associated with the GPU routine and (ii) a second argument corresponding to the first value of the GPU state, and control a workload of the GPU based on the execution of the first routine.

Example 23 includes the system of example 22, wherein the GPU state is a state of a first register in an Architectural Register File associated with a hardware thread of the GPU or a second register of a General-Purpose Register File of the hardware thread.

Example 24 includes the system of any of examples 22-23, wherein the identifier is a first identifier extracted from an encoded binary file, the encoded binary file including the long instruction trace, and the CPU is to determine the first value, the second value, and a hardware thread identifier from the encoded binary file, the hardware thread identifier to identify the hardware thread.

Example 25 includes the system of any of examples 22-24, wherein the hardware thread is a first hardware thread, the long instruction trace is a first long instruction trace associated with the first hardware thread, and the encoded binary file includes the first long instruction trace and one or more second long instruction traces associated with one or more second hardware threads, the one or more second hardware threads to generate the one or more second long instruction traces in response to one or more executions of the kernel, the encoded binary file representative of a multi-threaded GPU trace.

Example 26 includes the system of any of examples 22-25, wherein the kernel includes a device access instruction to be executed by the hardware thread, and the GPU is to determine one or more first register values of one or more respective first registers of a General-Purpose Register File of the GPU, determine one or more second register values of one or more respective second registers of an Architectural Register File of the GPU, and store the one or more first register values, the one or more second register values, one or more third register values, and the device access instruction in the long instruction trace, the one or more third register values corresponding to one or more respective destination registers associated with the device access instruction.

Example 27 includes the system of any of examples 22-26, wherein the CPU is to determine a utilization of the GPU based on the first GPU state, compare the utilization to a threshold, and in response to determining that the threshold has not been satisfied based on the comparison, cause at least one of an adjustment to the GPU routine or an increased number of computational tasks to be executed by the GPU to control the workload of the GPU.

Example 28 includes the system of any of examples 22-27, wherein the first routine is an instrumented routine including an emulation routine, further including an application, and the CPU is to insert a first callback routine in the instrumented routine before the emulation routine, the first callback routine to invoke a first application programming interface (API) to provide the second GPU state to the application, and insert a second callback routine in the instrumented routine after the emulation routine, the second callback routine to invoke the first API or a second API to provide the first GPU state to the application.

Example 29 includes a method comprising identifying a first routine based on an identifier of a second routine executed by a graphics processing unit (GPU), the first routine based on an emulation of the second routine, executing the first routine to determine a first value of a GPU state of the GPU, the first routine having (i) a first argument associated with the second routine and (ii) a second argument corresponding to a second value of the GPU state prior to executing the first routine, and controlling a workload of the GPU based on the first value of the GPU state.

Example 30 includes the method of example 29, wherein the GPU state is a state of a first register in an Architectural Register File associated with a hardware thread of the GPU or a second register of a General-Purpose Register File of the hardware thread.

Example 31 includes the method of any of examples 29-30, wherein the identifier is a first identifier extracted from an encoded binary file, and further including inserting one or more profile routines in a kernel to be executed by a hardware thread of the GPU, determine the second value of the GPU state prior to the hardware thread executing the kernel, and in response to the hardware thread executing the kernel, generating a long instruction trace to include the first value of the GPU state and a second identifier corresponding to the hardware thread.

Example 32 includes the method of any of examples 29-31, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

Example 33 includes the method of any of examples 29-32, wherein the kernel includes a device access instruction to be executed by the hardware thread, and further including determining one or more first register values of one or more respective first registers of a General-Purpose Register File of the GPU, determining one or more second register values of one or more respective second registers of an Architectural Register File of the GPU, and storing the one or more first register values, the one or more second register values, one or more third register values, and the device access instruction in the long instruction trace, the one or more third register values corresponding to one or more respective destination registers associated with the device access instruction.

Example 34 includes the method of any of examples 29-33, further including determining a utilization of the GPU based on the first GPU state, comparing the utilization to a threshold, and in response to determining that the threshold has not been satisfied based on the comparison, causing at least one of an adjustment to the second routine or an increased number of computational tasks to be executed by the GPU to control the workload of the GPU.

Example 35 includes the method of any of examples 29-34, wherein the first routine is an instrumented routine including an emulation routine, and further including inserting a first callback routine in the instrumented routine before the emulation routine, the first callback routine to invoke a first application programming interface (API) to provide the second GPU state to an application, and inserting a second callback routine in the instrumented routine after the emulation routine, the second callback routine to invoke the first API or a second API to provide the first GPU state to the application.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory;
instructions; and
at least one processor circuit to execute the instructions to at least:
identify a first routine based on an identifier of a second routine executed by a graphics processing unit (GPU), the first routine to emulate the second routine;
execute the first routine to determine a first value of a GPU state of the GPU, the first routine having (i) a first argument associated with the second routine and (ii) a second argument corresponding to a second value of the GPU state prior to executing the first routine, the first value and the second value from a long instruction trace generated by the GPU; and control a workload of the GPU based on the first value of the GPU state.

2. The apparatus of claim 1, wherein the GPU state is a state of a first register in an Architectural Register File associated with a hardware thread of the GPU or a second register of a General-Purpose Register File of the hardware thread.

3. The apparatus of claim 1, wherein the identifier is a first identifier extracted from an encoded binary file, and one or more of the at least one processor circuit is to:

insert one or more profile routines in a kernel to be executed by a hardware thread of the GPU; and the long instruction trace generated in response to an execution of the one or more profile routines by the GPU, the first value corresponding to a GPU register value after an execution of the kernel, the second value corresponding to the GPU register value prior to the execution of the kernel, the identifier to identify a hardware thread.

4. The apparatus of claim 3, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

5. The apparatus of claim 3, wherein the kernel includes a device access instruction to be executed by the hardware thread, and one or more of the at least one processor circuit is to:

determine one or more first register values of one or more respective first registers of a General-Purpose Register File of the GPU;

determine one or more second register values of one or more respective second registers of an Architectural Register File of the GPU; and store the one or more first register values, the one or more second register values, one or more third register values, and the device access instruction in the long instruction trace, the one or more third register values corresponding to one or more respective destination registers associated with the device access instruction.

6. The apparatus of claim 1, wherein one or more of the at least one processor circuit is to:

determine a utilization of the GPU based on the first GPU state;

compare the utilization to a threshold; and in response to determining that the threshold has not been satisfied based on the comparison, cause at least one of an adjustment to the second routine or an increased number of computational tasks to be executed by the GPU to control the workload of the GPU.

7. The apparatus of claim 1, wherein the first routine is an instrumented routine including an emulation routine, and one or more of the at least one processor circuit is to:

insert a first callback routine in the instrumented routine before the emulation routine, the first callback routine to invoke a first application programming interface (API) to provide the second GPU state to an application; and insert a second callback routine in the instrumented routine after the emulation routine, the second callback routine to invoke the first API or a second API to provide the first GPU state to the application.

8. The apparatus of claim 1, wherein one or more of the at least one processor circuit is to determine one or more operating parameters of the GPU based on the long instruction trace, the one or more operating parameters including at least one of:

an execution time parameter, a busy time parameter, an idle time parameter, an occupancy time parameter, a utilization parameter, an opcode to identify a GPU instruction, a type of GPU instruction, a "read SEND" instruction, an End-of-Thread instruction, a timestamp associated with a start of an execution of the kernel, or a timestamp associated with an end time of an execution of the kernel.

9. At least one non-transitory computer readable medium comprising instructions to cause at least one processor circuit to at least:

identify a first routine based on an identifier of a second routine executed by a graphics processing unit (GPU), the first routine based on an emulation of the second routine;

execute the first routine to determine a first value of a GPU state of the GPU, the first routine having (i) a first argument associated with the second routine and (ii) a second argument corresponding to a second value of the GPU state prior to executing the first routine, the first value and the second value based on a long instruction trace generated by the GPU; and control a workload of the GPU based on the first value of the GPU state.

10. The at least one non-transitory computer readable medium of claim 9, wherein the GPU state is a state of a first register in an Architectural Register File associated with a hardware thread of the GPU or a second register of a General-Purpose Register File of the hardware thread.

11. The at least one non-transitory computer readable medium of claim 9, wherein the identifier is a first identifier extracted from an encoded binary file, and the instructions, when executed, cause one or more of the at least one processor circuit to:

insert one or more profile routines in a kernel to be executed by a hardware thread of the GPU; and determine a hardware thread identifier from the long instruction trace, the long instruction trace generated by the hardware thread in response to an execution of the one or more profile routines by the hardware thread, the first value corresponding to a GPU register value after an execution of the kernel by the hardware thread, the second value corresponding to the GPU register value prior to the execution of the kernel by the hardware thread, the hardware thread identifier to identify the hardware thread.

12. The at least one non-transitory computer readable medium of claim 11, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

13. The at least one non-transitory computer readable medium of claim 11, wherein the kernel includes a device access instruction to be executed by the hardware thread, and the instructions, when executed, cause one or more of the at least one processor circuit to:

determine one or more first register values of one or more respective first registers of a General-Purpose Register File of the GPU;

determine one or more second register values of one or more respective second registers of an Architectural Register File of the GPU; and store the one or more first register values, the one or more second register values, one or more third register values, and the device access instruction in the long instruction trace, the one or more third register values corresponding to one or more respective destination registers associated with the device access instruction.

14. The at least one non-transitory computer readable medium of claim 9, wherein the instructions, when executed, cause one or more of the at least one processor circuit to:

determine a utilization of the GPU based on the first GPU state;

compare the utilization to a threshold; and in response to determining that the threshold has not been satisfied based on the comparison, cause at least one of an adjustment to the second routine or an increased number of computational tasks to be executed by the GPU to control the workload of the GPU.

15. The at least one non-transitory computer readable medium of claim 9, wherein the first routine is an instrumented routine including an emulation routine, and the instructions, when executed, cause one or more of the at least one processor circuit to:

insert a first callback routine in the instrumented routine before the emulation routine, the first callback routine to invoke a first application programming interface (API) to provide the second GPU state to an application; and insert a second callback routine in the instrumented routine after the emulation routine, the second callback routine to invoke the first API or a second API to provide the first GPU state to the application.

16. An apparatus comprising:

means for identifying a first routine based on an identifier of a second routine executed by a graphics processing unit (GPU), the first routine associated with an emulation of the second routine;

means for executing the first routine to determine a first value of a GPU state of the GPU, the first routine having (i) a first argument associated with the second routine and (ii) a second argument corresponding to a second value of the GPU state prior to executing the first routine, the first value and the second value based on a long instruction trace generated by the GPU; and means for controlling a workload of the GPU based on the first value of the GPU state.

17. The apparatus of claim 16, wherein the GPU state is a state of a first register in an Architectural Register File associated with a hardware thread of the GPU or a second register of a General-Purpose Register File of the hardware thread.

18. The apparatus of claim 16, wherein the identifier is a first identifier extracted from an encoded binary file, and further including:

means for inserting one or more profile routines in a kernel to be executed by a hardware thread of the GPU; and the means for executing to determine a hardware thread identifier from the long instruction trace generated in response to an execution of the one or more profile routines by the hardware thread, the first value corresponding to a GPU register value after an execution of the kernel by the hardware thread, the second value corresponding to the GPU register value prior to the execution of the kernel by the hardware thread, the hardware thread identifier to identify the hardware thread.

19. The apparatus of claim 18, wherein the hardware thread is a first hardware thread, the long instruction trace is a first long instruction trace associated with the first hardware thread, and the encoded binary file includes the first long instruction trace and one or more second long instruction traces associated with one or more second hardware threads, the encoded binary file representative of a multi-threaded GPU trace.

20. The apparatus of claim 18, wherein the kernel includes a device access instruction to be executed by the hardware thread, and the means for executing is to:

determine one or more first register values of one or more respective first registers of a General-Purpose Register File of the GPU;

determine one or more second register values of one or more respective second registers of an Architectural Register File of the GPU; and store the one or more first register values, the one or more second register values, one or more third register values, and the device access instruction in the long instruction trace, the one or more third register values corresponding to one or more respective destination registers associated with the device access instruction.

21. The apparatus of claim 16, further including means for determining a utilization of the GPU based on the first GPU state, and the means for controlling is to, in response to determining that the utilization does not satisfy a threshold, cause at least one of an adjustment to the second routine or an increased number of computational tasks to be executed by the GPU to control the workload of the GPU.

22. The apparatus of claim 16, wherein the first routine is an instrumented routine including an emulation routine, and the means for executing is to:

insert a first callback routine in the instrumented routine before the emulation routine, the first callback routine to invoke a first application programming interface (API) to provide the second GPU state to an application; and insert a second callback routine in the instrumented routine after the emulation routine, the second callback routine to invoke the first API or a second API to provide the first GPU state to the application.

23. A system comprising:

a graphics processing unit (GPU) having a hardware thread, the hardware thread to:

determine a first value of a GPU state;

execute a GPU routine included in a kernel to determine a second value of the GPU state; and generate a long instruction trace including the GPU routine, the first value, and the second value; and a central processing unit (CPU) to:

insert one or more profile routines in the kernel;

identify a first routine based on an identifier of the GPU routine, the first routine based on an emulation of the GPU routine;

execute the first routine to replay execution of the GPU routine to determine the second value of the GPU state, the first routine to have (i) a first argument associated with the GPU routine and (ii) a second argument corresponding to the first value of the GPU state; and control a workload of the GPU based on the execution of the first routine.

24. The system of claim 23, wherein the GPU state is a state of a first register in an Architectural Register File associated with a hardware thread of the GPU or a second register of a General-Purpose Register File of the hardware thread.

25. The system of claim 23, wherein the identifier is a first identifier extracted from an encoded binary file, the encoded binary file including the long instruction trace, and the CPU is to determine the first value, the second value, and a hardware thread identifier from the encoded binary file, the hardware thread identifier to identify the hardware thread.

26. The system of claim 25, wherein the hardware thread is a first hardware thread, the long instruction trace is a first long instruction trace associated with the first hardware thread, and the encoded binary file includes the first long instruction trace and one or more second long instruction traces associated with one or more second hardware threads, the one or more second hardware threads to generate the one or more second long instruction traces in response to one or more executions of the kernel, the encoded binary file representative of a multi-threaded GPU trace.

27. The system of claim 25, wherein the kernel includes a device access instruction to be executed by the hardware thread, and the GPU is to:
   determine one or more first register values of one or more respective first registers of a General-Purpose Register File of the GPU;
   determine one or more second register values of one or more respective second registers of an Architectural Register File of the GPU; and
   store the one or more first register values, the one or more second register values, one or more third register values, and the device access instruction in the long instruction trace, the one or more third register values corresponding to one or more respective destination registers associated with the device access instruction.

28. The system of claim 23, wherein the CPU is to:
   determine a utilization of the GPU based on the first GPU state;
   compare the utilization to a threshold; and
   in response to determining that the threshold has not been satisfied based on the comparison, cause at least one of an adjustment to the GPU routine or an increased number of computational tasks to be executed by the GPU to control the workload of the GPU.

29. The system of claim 23, wherein the first routine is an instrumented routine including an emulation routine, further including an application, and the CPU is to:
   insert a first callback routine in the instrumented routine before the emulation routine, the first callback routine to invoke a first application programming interface (API) to provide the second GPU state to the application; and
   insert a second callback routine in the instrumented routine after the emulation routine, the second callback routine to invoke the first API or a second API to provide the first GPU state to the application.

\* \* \* \* \*